US007819497B2

(12) United States Patent
Konno et al.

(10) Patent No.: US 7,819,497 B2
(45) Date of Patent: Oct. 26, 2010

(54) INK JET PRINTING APPARATUS AND METHOD FOR SELECTING PRINT MODE

(75) Inventors: Yuji Konno, Kawasaki (JP); Hiroshi Tajika, Yokohama (JP); Hitoshi Nishikori, Inagi (JP); Daisaku Ide, Tokyo (JP); Hideaki Takamiya, Yokohama (JP); Kiichiro Takahashi, Yokohama (JP); Toshiyuki Chikuma, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 503 days.

(21) Appl. No.: 11/954,793

(22) Filed: Dec. 12, 2007

(65) Prior Publication Data
US 2008/0143776 A1 Jun. 19, 2008

(30) Foreign Application Priority Data
Dec. 18, 2006 (JP) ............................. 2006-339953

(51) Int. Cl.
*B41J 29/393* (2006.01)
(52) U.S. Cl. .......................................... 347/19; 347/14
(58) Field of Classification Search .................. 347/14, 347/19
See application file for complete search history.

(56) References Cited

U.S. PATENT DOCUMENTS

| 5,712,666 | A | 1/1998 | Matsubara et al. ............ 347/19 |
| 6,039,426 | A * | 3/2000 | Dobbs ......................... 347/19 |
| 6,260,938 | B1 | 7/2001 | Ohtsuka et al. |
| 6,729,709 | B2 | 5/2004 | Konno et al. |
| 6,808,247 | B2 | 10/2004 | Kawatoko et al. |
| 7,090,332 | B2 | 8/2006 | Konno et al. |
| 7,114,790 | B2 | 10/2006 | Seki et al. |
| 7,328,963 | B2 | 2/2008 | Tajika et al. |
| 2002/0060718 | A1 | 5/2002 | Welten et al. |
| 2008/0143772 | A1 | 6/2008 | Konno et al. |

FOREIGN PATENT DOCUMENTS

| EP | 0 955 768 A2 | 11/1999 |
| EP | 1 018 428 | 7/2000 |

(Continued)

OTHER PUBLICATIONS

European Search Report, Application No. 07024292.0-2304/1935658, European Patent Office, Oct. 26, 2009.

*Primary Examiner*—Julian D Huffman
(74) *Attorney, Agent, or Firm*—Fitzpatrick, Cella, Harper & Scinto

(57) ABSTRACT

Printing can be properly performed on a print medium other than print media preset in accordance with print modes of a printer. Specifically, when the print medium other than the print media preset in accordance with the print modes is used, patches are printed on the print medium in each combination of the ink ejection amount and the number of passes, and information regarding each evaluation of granularity and banding based on colorimetry of the patches is obtained for each combination of the ink ejection amount and the number of passes. Next, a combination of the maximum ink ejection amount and the maximum number of passes is selected from the combinations that each evaluation of the granularity and the banding satisfies a certain level. Then, a print mode having a combination nearest the combination is selected from the plurality of print modes.

12 Claims, 29 Drawing Sheets

FOREIGN PATENT DOCUMENTS

| | | |
|---|---|---|
| EP | 1 072 421 | 1/2001 |
| JP | 2003-034063 | 2/2003 |
| JP | 2004-106367 | 4/2004 |
| JP | 2004-106522 | 4/2004 |
| RU | 2 126 328 | 2/1999 |

* cited by examiner

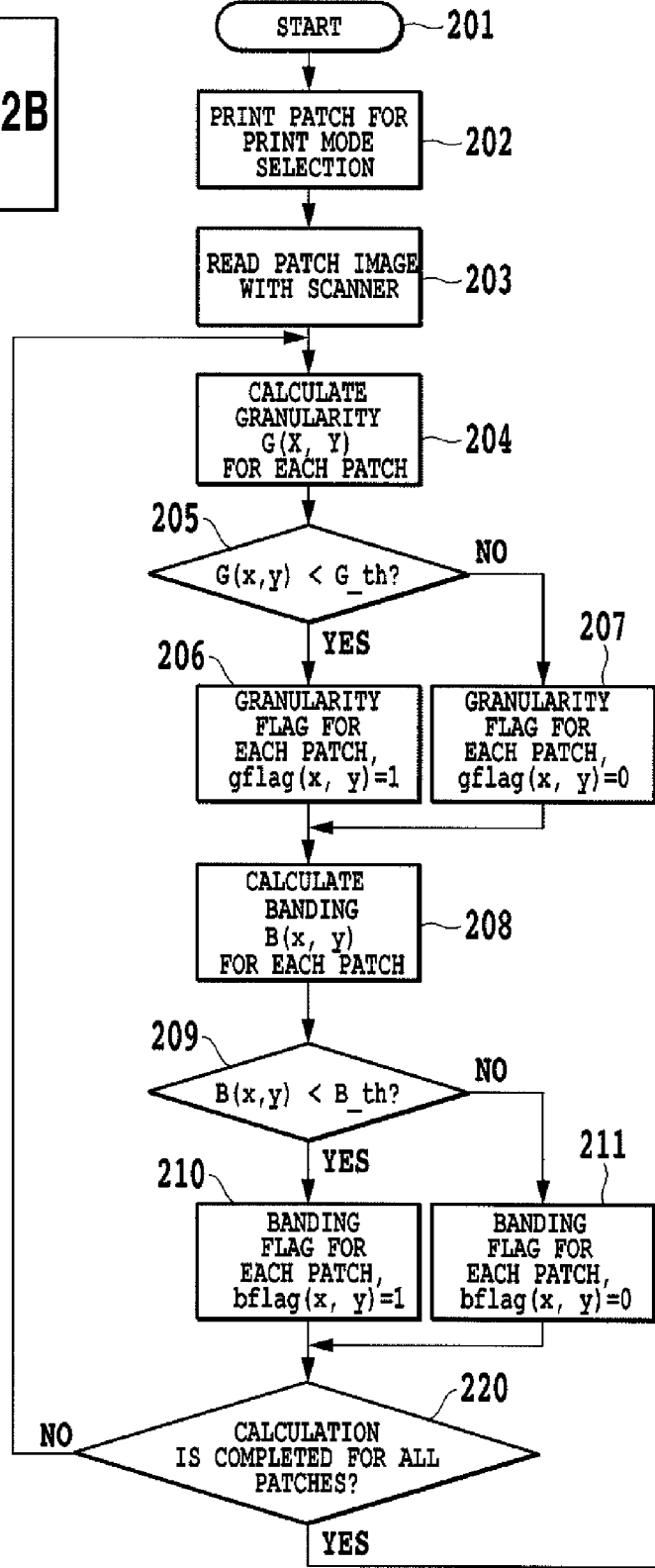

START OPTIMUM PRINT MODE
SELECTION PROCESS
REGARDING YOUR PAPER

YES    NO

FIG.4

|  |  | PRINT QUALITY | | |
|---|---|---|---|---|
|  |  | DRAFT | STANDARD | HIGH IMAGE QUALITY |
| PAPER TYPE | PLAIN PAPER | 1-PASS | 2-PASS | 4-PASS |
|  | COATED PAPER |  | 4-PASS | 8-PASS |
|  | GLOSSY PAPER A |  | 4-PASS | 8-PASS |
|  | GLOSSY PAPER B |  | 8-PASS | 12-PASS |
|  | SEMI-GLOSSY PAPER A |  | 6-PASS | 12-PASS |
|  | SEMI-GLOSSY PAPER B |  | 12-PASS | 24-PASS |
|  | MAT PAPER A |  | 12-PASS | 24-PASS |
|  | MAT PAPER B |  | 12-PASS | 24-PASS |

FIG.10

| PAPER TYPE | PRINT QUALITY | | | | | |
|---|---|---|---|---|---|---|
| | DRAFT | | STANDARD | | HIGH IMAGE QUALITY | |
| | 1-PASS | 50% | | | | |
| PLAIN PAPER | | | 2-PASS | 100% | 4-PASS | 120% |
| COATED PAPER | | | 4-PASS | 200% | 8-PASS | 240% |
| GLOSSY PAPER A | | | 4-PASS | 160% | 8-PASS | 180% |
| GLOSSY PAPER B | | | 8-PASS | 140% | 12-PASS | 140% |
| SEMI-GLOSSY PAPER A | | | 6-PASS | 140% | 12-PASS | 160% |
| SEMI-GLOSSY PAPER B | | | 12-PASS | 120% | 24-PASS | 120% |
| MAT PAPER A | | | 12-PASS | 180% | 24-PASS | 200% |
| MAT PAPER B | | | 12-PASS | 220% | 24-PASS | 240% |

FIG.11

| NUMBER OF PASSES | INK EJECTION AMOUNT | | | | | | | |
|---|---|---|---|---|---|---|---|---|
| | 100% | 120% | 140% | 160% | 180% | 200% | 220% | 240% |
| 24 | | SEMI-GLOSSY PAPER B, HIGH IMAGE QUALITY | | | | | | |
| 12 | | SEMI-GLOSSY PAPER B, STANDARD | GLOSSY PAPER B, HIGH IMAGE QUALITY | SEMI-GLOSSY PAPER A, HIGH IMAGE QUALITY | MAT PAPER A, STANDARD | MAT PAPER A, HIGH IMAGE QUALITY | | MAT PAPER B, HIGH IMAGE QUALITY |
| 8 | | | GLOSSY PAPER B, STANDARD | | | | MAT PAPER B, STANDARD | |
| 6 | | | SEMI-GLOSSY PAPER A, STANDARD | | GLOSSY PAPER A, HIGH IMAGE QUALITY | | | COATED PAPER B, HIGH IMAGE QUALITY |
| 4 | | PLAIN PAPER, HIGH IMAGE QUALITY | | GLOSSY PAPER A, STANDARD | | COATED PAPER, STANDARD | | |

FIG.12

| y \ x | 0 | 1 | 2 | 3 | 4 | 5 | 6 | 7 | |
|---|---|---|---|---|---|---|---|---|---|
| | INK EJECTION AMOUNT → NUMBER OF PASSES | 100% | 120% | 140% | 160% | 180% | 200% | 220% | 240% | |
| 0 | 24 | [1,1] | [1,1] | [1,1] | [1,1] | [1,1] | [1,1] | [0,1] | [0,1] | |
| 1 | 12 | [1,1] | [1,1] | [1,1] | [1,1] | [1,1] | [1,1] | [0,1] | [0,1] | |
| 2 | 8 | [1,1] | [1,1] | [1,1] | [1,1] | [0,1] | [1,1] | [0,0] | [0,0] | |
| 3 | 6 | [1,1] | [1,1] | [1,0] | [0,1] | [0,0] | [0,0] | [0,0] | [0,0] | |
| 4 | 4 | [1,1] | [1,0] | [0,0] | [0,0] | [0,0] | [0,0] | [0,0] | [0,0] | |

FIG.13

REGISTER PRINT MODE
SETTING SELECTED REGARDING
YOUR PAPER

YES   NO

FIG.15

WHICH CATEGORY DOES
YOUR PAPER BELONG TO

☐ COATED PAPER, MAT PAPER TYPE

■ GLOSSY PAPER, SEMI-GLOSSY
   PAPER TYPE

☐ OTHER

☐ UNKNOWN

FIG.16

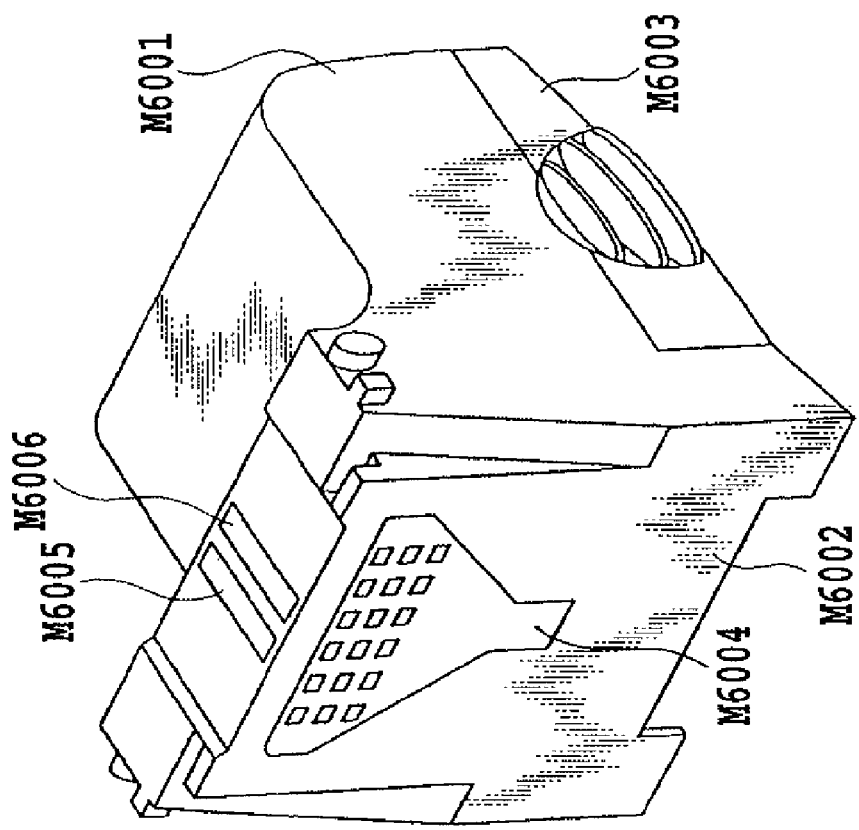
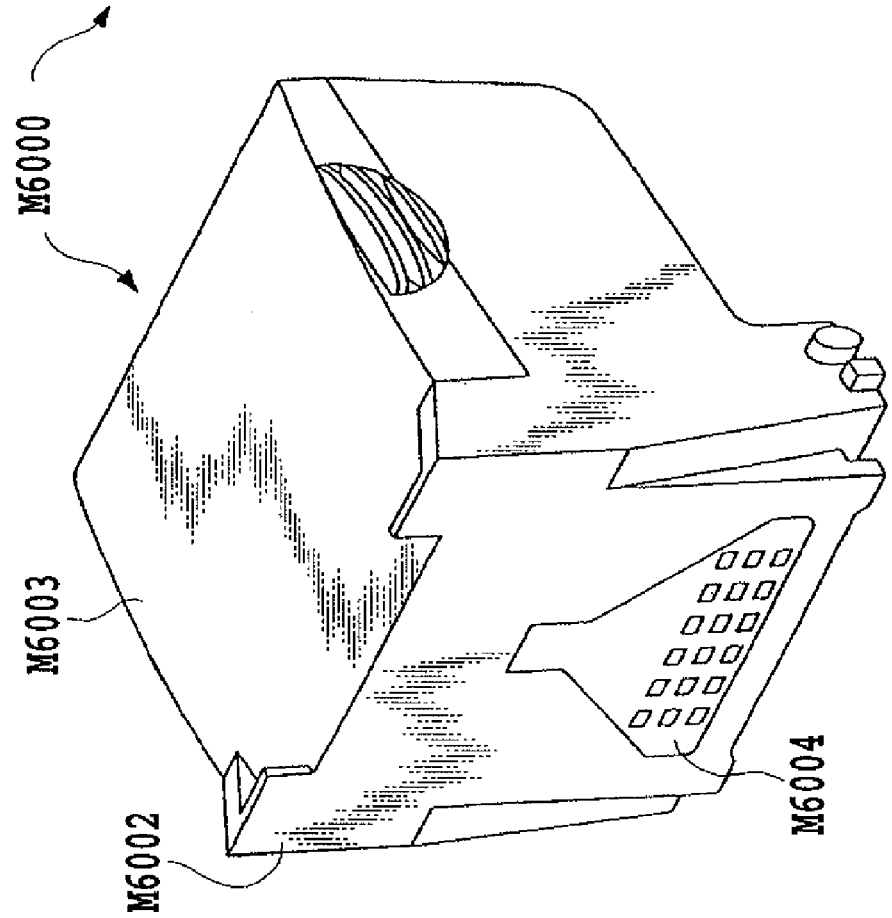
FIG.23B
FIG.23A

TWO MODES ARE USABLE
FOR YOUR PAPER
WHICH ONE WILL YOU USE

SPEED PRIORITY MODE

IMAGE PRIORITY MODE

FIG.26

INK JET PRINTING APPARATUS AND METHOD FOR SELECTING PRINT MODE

BACKGROUND OF THE INVENTION

1. Field of the Invention

The present invention relates to an inkjet printing apparatus and a method for selecting a print mode. More particularly, the present invention relates to an ink jet printing apparatus and a method which are capable of automatically selecting the print mode in accordance with a print medium such as paper which is used for the ink jet printing apparatus.

2. Description of the Related Art

The recent rapid improvement of image quality and rapid price-reduction on color printers, coupled with popularization of digital cameras, has allowed anyone to obtain an environment of easily outputting, at home, a print having image quality the same as that of a silver halide photograph. In particular, an ink jet printer is one outputting high image quality and is relatively low-priced. Additionally, the ink jet printer has received broad support by users as a printer capable of printing on print medium such as plain paper, coated paper or glossy paper, on a special medium such as canvas paper, Japanese-paper or cloth, and further on a print medium such as CDs or DVDs including an ink receiving layer.

Print media for various uses are now available for such ink jet printers. A user of a printer may buy genuine papers sold by the same maker as that of the printer held by the user, and alternatively may buy non-genuine paper sold by another maker.

In a case of the former, since software such as a printer driver of a printer generally includes print modes corresponding to a print sheet that a user buys, printing can be satisfactorily performed when the user properly selects the print mode in accordance with the bought print sheet. In a case of the later, if a recommended print mode for the printer held by a user is designated on a bought non-genuine medium, the user can select the print mode in accordance with the designation.

However, in the case where the recommended print mode is not designated on the non-genuine medium, or where the printer held by the user is not designated on the non-genuine medium, the user may not decide which print mode set in the printer should be selected for printing on the print sheet that the user bought.

There are various categories of print sheet, e.g. plain paper, coated paper, glossy paper, semi-glossy paper and mat paper. A category of print sheet is frequently selected, through the printer driver, with use of the proper name of genuine paper of a printer maker. Thus, there is a possibility that a user having little knowledge regarding the print sheet hardly knows which genuine paper corresponds to the non-genuine medium. In particular, in the case where there are three or four types of genuine media for the glossy paper, the user is further confused.

In this case, when the user selects any one of the print modes for printing, the selected print mode may be inappropriate. For example, when a print mode in which ink is possibly applied to a print medium used for printing at an amount more than an ink absorbable amount of a receiving layer of the print medium used is selected, the whole ink can not be absorbed in a region where an ink ejection amount on an image is great. In this case, the ink is accumulated in the vicinity of the surface layer of the print medium, and a so-called beading phenomenon occurs where large lined beads are formed by the surface tension of ink. When the beading phenomenon occurs, the granularity is greatly increased and the quality of the image is lowered.

Additionally, the ink jet printer, in many cases, performs so-called multi-pass printing where printing is dividedly performed by a plurality of passes (scans). Generally, for the print medium such as plain paper in which the ink easily bleeds, positional deviation of dots and unevenness of the diameters of the dots, which are formed on the print sheet with the ink ejected from a nozzle of a print head, hardly noticeable due to the bleeding of ink. From this point of view, in the case of using such paper, it becomes possible to perform printing in a print mode having a relatively small number of passes. For example, one-pass printing for performing printing with one pass or the multi-pass printing of two-pass which has a relatively small number of passes, can be performed on the plain paper. On the other hand, a print mode in which printing with a relatively large number of passes is performed is applicable to a print medium such as glossy paper, glossy film and the like, for which the ink hardly bleeds and thus printing is sensitive to the positional deviation of the dots and the unevenness of the diameter of the dots. For example, further multi-pass printing such as 8-pass printing or 16-pass printing is required for the above print medium compared with one-pass or two-pass printing for the plain paper. If a user selects a print mode of a relatively small number of passes for the print medium for which a print mode of a relatively large number of passes should be selected by right, a so-called banding occurs, which is a band-shaped density unevenness caused by the above described dot positional deviation or the like.

Additionally, a connection stripe which is caused at a connection portion between the passes is known as one of the causes of the banding. Specifically, ink ejected at the connection portion during a certain pass bleeds into the connection portion to which ink is ejected during another pass to locally increase the density of connection portion, and thus the connection stripe occurs. In the case where the number of passes is small and thus a print duty per one time of pass is high, the connection stripe is more likely to occur. Further, in so-called bidirectional printing where the print head is made to reciprocate in a main-scanning direction so that printing is performed during a forward scan and a backward scan, landing orders of inks having different colors onto the print medium are different between the forward scan and the backward scan. This may cause the tints of the dots finally formed with inks of different colors to be different between the forward scan and the backward scan. Macroscopically viewing this, this difference appears as so-called bidirectional color unevenness in which it is recognized that the color of the region for which printing is performed by the forward scan is different from that of the region for which printing is performed by the backward scan. Moreover, the details of a mechanism for causing the banding phenomenon are disclosed in Japanese Patent Laid-Open No. 2004-106522 disclosing the invention of the inventors of this application. In the case where the phenomenon occurs in multi-pass printing, generally, the bidirectional color unevenness becomes more noticeable as the number of passes is smaller. Additionally, permeation and color development of the ink are severely affected by the phenomenon, and the level of occurrence of the phenomenon is largely varied also depending on type of a print medium used.

As described above, the banding phenomenon perceived as the band-shaped density unevenness in a sub-scanning direction may occur due to the connection stripe or the bidirectional color unevenness, and the banding tends to become more noticeable when the number of passes is smaller, correspondingly to the print medium used for printing.

As described above, if printing is performed in the print mode selected by a user selects in an uncertain expectation, to the print medium held by the user, and the print medium is not appropriate one for the selected print mode, the beading and banding possibly occur and cause deterioration in the quality of a printed image.

Further, in this instance, there is a possibility that inefficient work is repeated, which is printing operation in another print mode and recheck in the case where trouble occurs in a result of printing performed in the print mode selected by the user. Additionally, such repetition of test printing for searching an optimum print mode results in waste of print sheet and ink.

On the other hand, in the field of ink jet printing, it is known that a printing manner is automatically adjusted or controlled in a printer or the like based on a result of printing that actually prints test patterns or patches.

A representative example of the technology is disclosed in Japanese Patent Laid-Open No. 2004-106367. The patent document discloses a technology where printing arbitrary pattern for color adjustment is performed and a user views a print result of the pattern to perform a desirable color adjustment.

Additionally, a calibration system and a profile creation system are available, which employ a scanner or spectrophotometric calorimeter having high precision, as a method other than that disclosed in Japanese Patent Laid-Open No. 2004-106367. In the systems, the printer is made to print a predetermined patch, colorimetry is performed with use of the scanner or spectrophotometric calorimeter, and a LUT table for correcting color is recreated or a parameter for adjusting color is adjusted based on the colorimetry result, so that a desirable color is outputted onto print medium as desired by the user.

However, the technology disclosed in Japanese Patent Laid-Open No. 2004-106367 is only a technology for adjusting a tint. Although the color adjustment can be performed for a non-genuine record medium with use of the disclosed technology, the disclosed technology cannot prevent beading and banding from occurring due to an excess of ink ejection amount and mismatch of the number of passes respectively.

Additionally, in the case of the above available systems, the user has to determine which print mode of the printer is used for the held print medium in printing a patch for creating a color correction table. Accordingly, in the case where an inappropriate print mode is selected, there still remains the possibility that the beading phenomenon or banding phenomenon occurs.

As described above, for adjustment of color, a system such as the calibration system and the profile creation system, which is based on the actual print of the test patterns or patches, has been conventionally used. However, these systems are insufficient in properly performing printing on a print medium such as a non-genuine medium other than the print media preset in accordance with the print modes of the printer.

Moreover, in print medium available by various makers, a same glossy paper type or a same mat paper type may have different bleeding rates and different color development properties from one another, and thus there are many cases where the banding occurs or does not occur for the same number of passes. Accordingly, it is remarkably difficult for users to estimate the necessary number of passes based on only the type of print medium (for example, either glossy paper type or mat paper type).

SUMMARY OF THE INVENTION

An object of the present invention is to provide an ink jet printing apparatus capable of properly performing printing even on a print medium other than print media preset in accordance with print modes of a printer, and a method for selecting a print mode appropriate for such print medium.

In the first aspect of the present invention, there is provided an ink jet printing apparatus that uses print head to perform printing and is capable of executing a plurality of print modes of printing which are distinguished from each other by mode parameters and are set correspondingly to types of print medium, the apparatus comprising: a patch printing unit that prints a plurality of patches in which values of the mode parameters are differentiated, when print medium other than print media corresponding to the respective plurality of print modes is used; an evaluation obtaining unit that obtains image evaluation information for each of mode parameters that are differentiated from each other, based on measurement results of the printed patches; and a selecting unit that selects one print mode from the plurality of print modes set correspondingly to the types of print medium, based on the mode parameters for which evaluations indicated by the image evaluation information are above a certain evaluation level.

In the second aspect of the present invention, there is provided an ink jet printing apparatus that uses print head to perform printing and is capable of executing a plurality of print modes of printing which are distinguished from each other by mode parameters and are set correspondingly to types of print medium, the apparatus comprising: a storing unit that stores data of a plurality of patches in which contents of the mode parameters are differentiated; a patch printing unit that prints a plurality of patches with reference to the data of patches stored in the storing unit, when print medium other than print media corresponding to the respective plurality of print modes is used; and a print control unit that, when print medium other than print media corresponding to the respective plurality of print modes is used, performs printing to the print medium in one print mode selected from the plurality of print modes.

In the third aspect of the present invention, there is provided a print mode selecting method in an ink jet printing apparatus that uses print head to perform printing and is capable of executing a plurality of print modes of printing which are distinguished from each other by mode parameters and are set correspondingly to types of print medium, the method comprising: a patch printing step of printing a plurality of patches in which values of the mode parameters are differentiated, when print medium other than print media corresponding to the respective plurality of print modes is used; an evaluation obtaining step of obtaining image evaluation information for each of mode parameters that are differentiated from each other, based on measurement results of the printed patches; and a selecting step of selecting one print mode from the plurality of print modes set correspondingly to the types of print medium, based on the mode parameters for which evaluations indicated by the image evaluation information are above a certain evaluation level.

According to the above configurations, printing can be properly performed on the print medium other than the print media previously set in accordance with the print modes of the printer.

Further features of the present invention will become apparent from the following description of exemplary embodiments (with reference to the attached drawings).

BRIEF DESCRIPTION OF THE DRAWINGS

FIG. 4 is a view showing a UI for making a user determine print mode selection processing start in the first embodiment;

FIG. 10 is a diagram showing a correspondence print mode of the ink jet printer according to the first embodiment and the number of passes thereof;

FIG. 11 is a diagram showing a relationship between the correspondence print mode of the ink jet printer according to the first embodiment, the number of passes thereof and the ink ejection amount thereof;

FIG. 12 is a diagram showing the correspondence print mode of the ink jet printer according to the first embodiment for each combination of the ink ejection amount and the number of passes;

FIG. 13 is a diagram showing threshold determination flags of values of granularity and banding for each combination of the ink ejection amount and the number of passes;

FIG. 15 is a view showing a UI for making the user determine whether to register the selected print mode in the first embodiment;

FIG. 16 is a view showing a UI for making the user select a category of print sheet in a second embodiment of the present invention;

FIG. 23A and FIG. 23B are perspective views showing a scanner cartridge used in the ink jet printer;

FIG. 26 is a view showing a UI for making the user select two types of modes in the fourth embodiment.

DESCRIPTION OF THE EMBODIMENTS

Hereinafter, embodiments of the present invention will be described in detail with reference to the drawings.

First Embodiment

Figure 1:
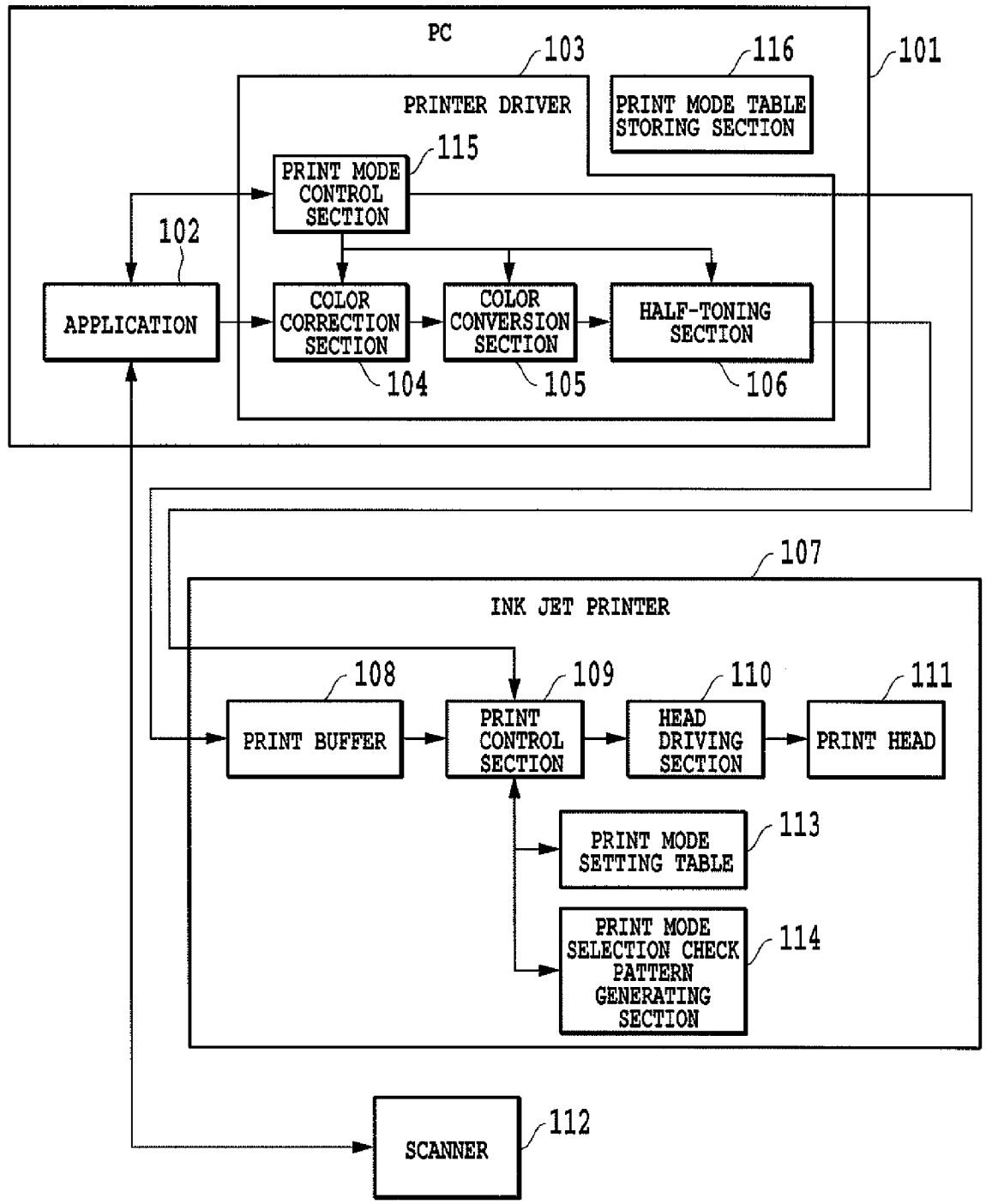
FIG. 1 is a block diagram illustrating a printing system according to a first embodiment of the present invention.

FIG. 1 is a block diagram showing a printing system using an ink jet printer according to a first embodiment of the present invention. The system includes a personal computer (PC) 101 as a host apparatus, a printer 107 as an ink jet printing apparatus and a scanner 112.

Figure 2B:
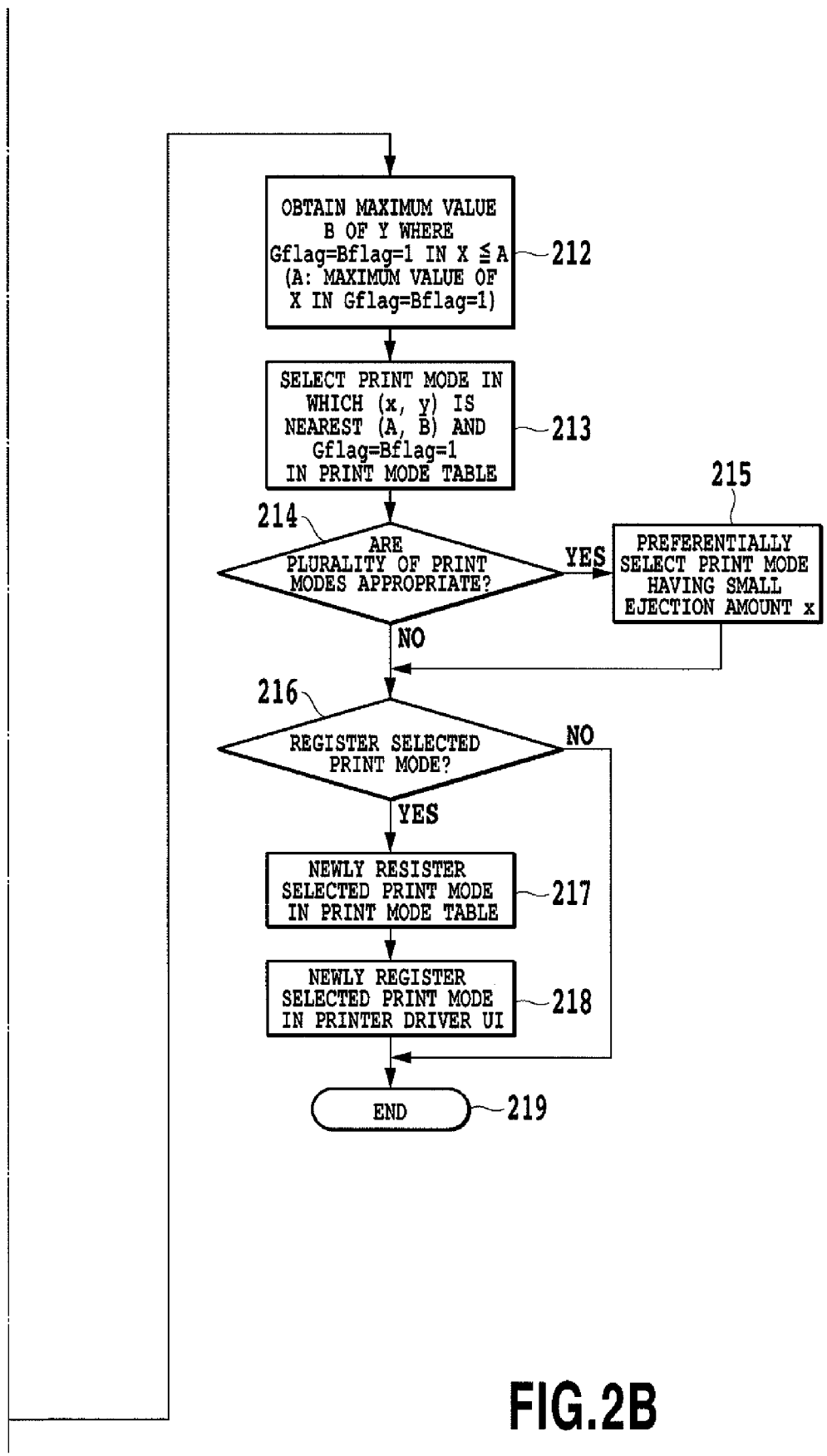
FIG. 2 is a diagram showing a relation between FIG. 2A and FIG. 2B, FIGS. 2A and 2B are flowcharts showing print mode selection processing according to the first embodiment.

The PC 101 uses an application 102 and a printer driver 103 that are installed in the PC as software, for print processing using the printer 107. The application 102, as described below in detail, controls a printing operation in the ink jet printer 107 through the printer driver 103, based on information transmitted from the scanner 112, and executes control for selecting a print mode in accordance with print medium. Further, the PC 101, as shown in FIG. 2, executes print mode selection processing in accordance with a program stored in a predetermined memory.

In the printer driver 103, a color correction section 104 subjects e.g. an RGB 24-bit signal inputted by the application 102 to color correction in accordance with an output property of the printer to which the signal is outputted, and converts the signal into different RGB 24-bit signal. A color conversion section 105 converts the RGB signal inputted from the color correction section into a signal of ink color used for the ink jet printer 107 for output. The inkjet printer 107 of the present embodiment outputs ink of six colors, cyan, magenta, yellow, black, light cyan and light magenta (hereinafter, referred to as C, M, Y, K, LC and LM). Accordingly, the color conversion section 105 outputs a 72-bit signal, each signal value of the six colors of C, M, Y, K, LC and LM being 12-bit and totaling up to 72 bits. A half-toning section 106 subjects a multi-value signal of a 12-bit signal of each color, which is inputted from the color conversion section 105, to pseudo intermediate processing such as an error diffusion, and converts the processed multi-value signal into a signal having the number of gradations that can be expressed by the ink jet printer, that is, a binary signal of 1-bit. Moreover, as another half-toning processing, there exists multi-half-toning processing having 4 to 16 values of 2 bits to 4 bits. In this case, the ink jet printer executes index pattern development processing for developing data of 2-bit to 4-bit to a dot pattern having several dots as one unit.

A print mode control section 115 of the printer driver 103 sets various kinds of parameters used for the color correction section, color conversion section and half-toning section in accordance with the type of print sheet and print quality designated on a UI of the printer driver. Further, print mode information is transmitted, as control commands, to the ink jet printer 107. Additionally, a print mode table storing section 116, which will be described later with reference to FIG. 2, stores the print mode information to register a print mode appropriate for new print sheet.

On the other hand, in the ink jet printer 107, binary image data that has been subjected to the half-toning processing an ¥d is transmitted from the printer driver 103 is inputted to and temporally stored in a print buffer 108. Specifically, data for one scan of a print head of the printer is stored in a buffer memory. A print control section 109 subjects the image data stored in the print buffer 108 to so-called multi-pass print control for printing at a divided plurality of passes. Print mode information (type of print sheet and quality) of print mode setting designated by the printer driver 103 is inputted to the print control section, and the print control section, in accordance with the information, refers to a print mode setting table 113 and determines the number of passes (number of scans) of multi-pass printing.

FIG. 10 shows an example of the print mode setting table. In the case where the print mode information inputted from the printer driver is, for example, "semi-glossy paper B, standard," the print control section 109 refers to the print mode setting table 113 to determine 12-pass as the number of passes of the multi-pass printing.

Referring to FIG. 1 again, a head driving section 110 controls a clock signal, a pulse signal, voltage and the like to drive a print head 111. The print head 111 ejects ink from nozzles based on drive control of the head driving section 110.

Figures 9A, 9B:
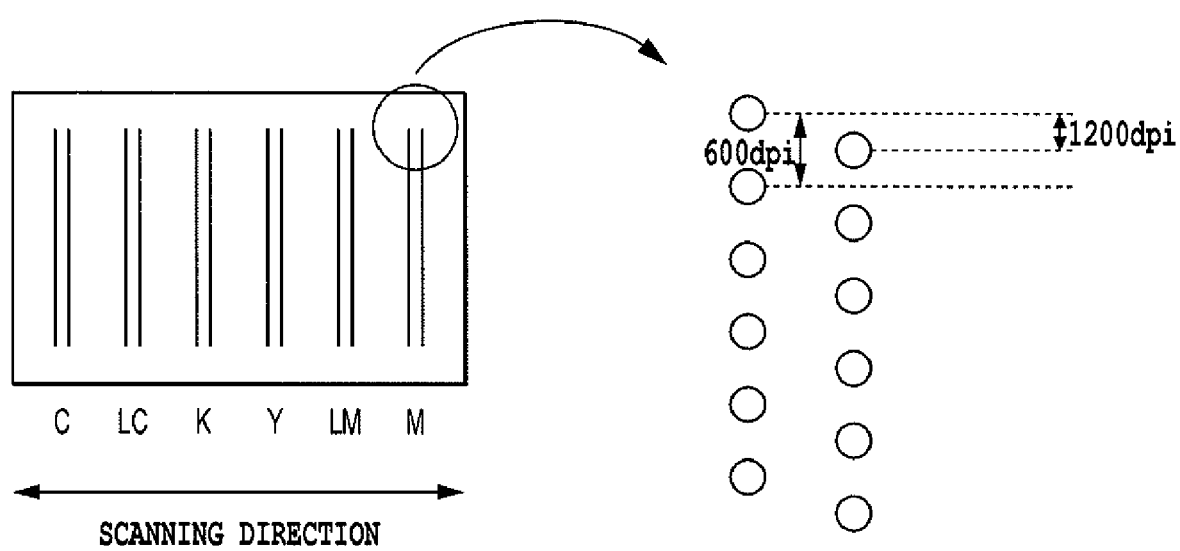
FIG. 9A and FIG. 9B are diagrams illustrating a nozzle arrangement of a print head used in an ink jet printer according to the first embodiment.

FIG. 9A and FIG. 9B are schematic views showing a surface in which the nozzles (eject ports) of the print head 111 are provided. As shown in FIG. 9A, in the print head of the present embodiment, nozzle lines of the ink of six colors, C, LC, K, Y, LM and M, are arranged in a scanning direction in this order. The two nozzle lines are provided for each ink color. As shown in FIG. 9B that is an enlarged view of the nozzle lines, the nozzles are arranged at an interval of 600 dpi in one of the two nozzle lines of each ink color, and similarly arranged at the interval equivalent to 600 dpi in the other nozzle line. Additionally, the two nozzle lines are arranged so as to be shifted from each other at the distance equivalent to 1200 dpi, and form a staggered arrangement.

FIG. 2 is a flowchart showing the print mode selection processing according to the first embodiment of the present invention. This processing is executed in the PC 101 to select an appropriate print mode for print medium which is held by a user and for which an appropriate print mode is uncertain.

The user instructs the application 102 to execute processing for automatically selecting a print mode for the print medium which the user hold to use for printing through the UI display by the application 102 on the PC 101, and thus the processing starts. FIG. 4 shows the UI display. Specifically, the user can select the "Yes" or "No" button on the display, and the processing is started in Step 201 by selecting and operating "Yes" button.

First, patches as check patterns for print mode selection are printed in Step 202. Here, the application 102 instructs the print control section 109 of the ink jet printer 107 to print a check pattern through the print mode control section 115 of the printer driver 103. The print control section 109, in response to the instruction of printing the check pattern, takes out check pattern data stored in a print mode selection check pattern generating section 114 and prints the check pattern for print mode selection.

Figure 3:
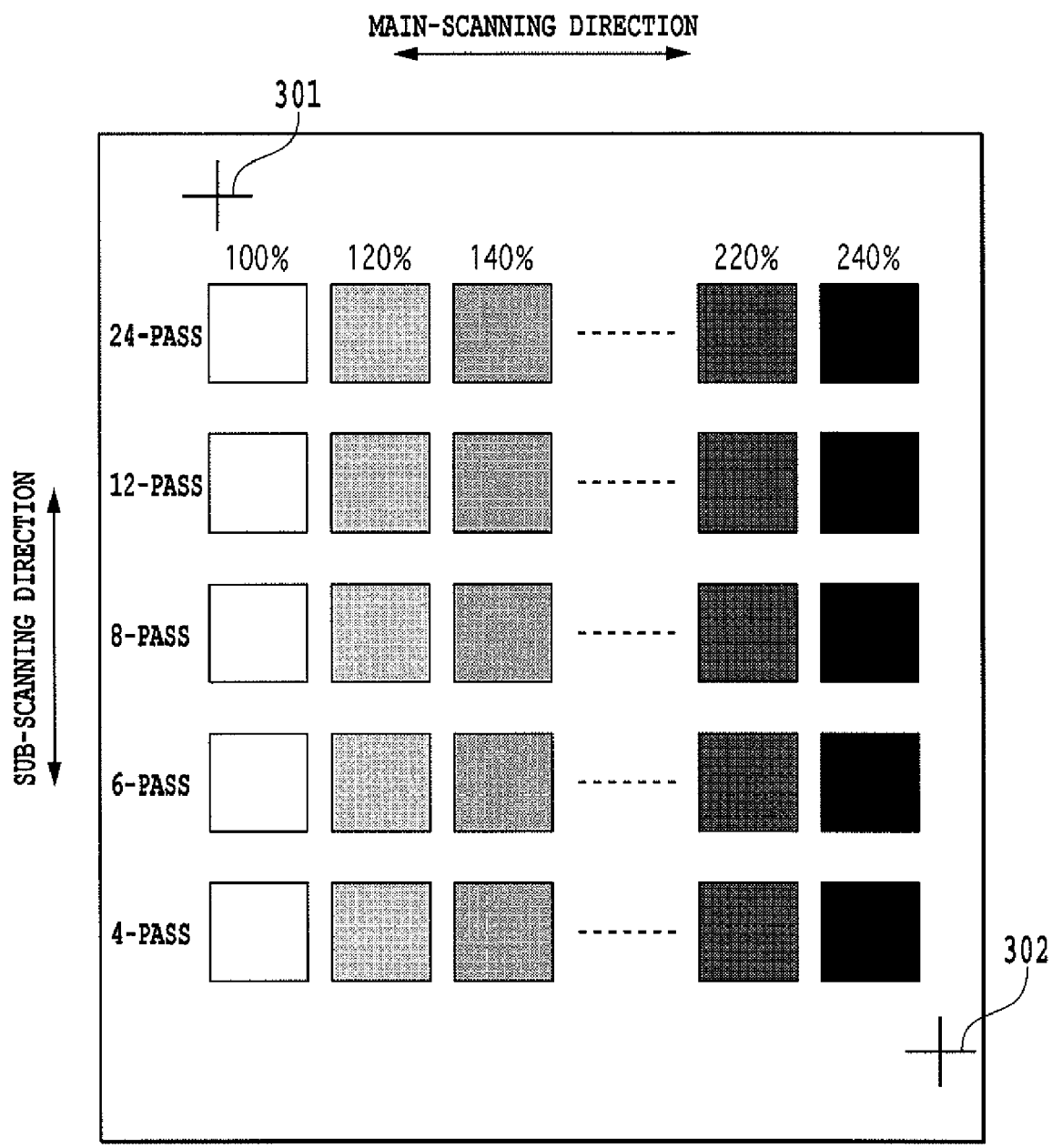
FIG. 3 is a diagram illustrating a check pattern for print mode selection printed in the first embodiment.
Figure 6:
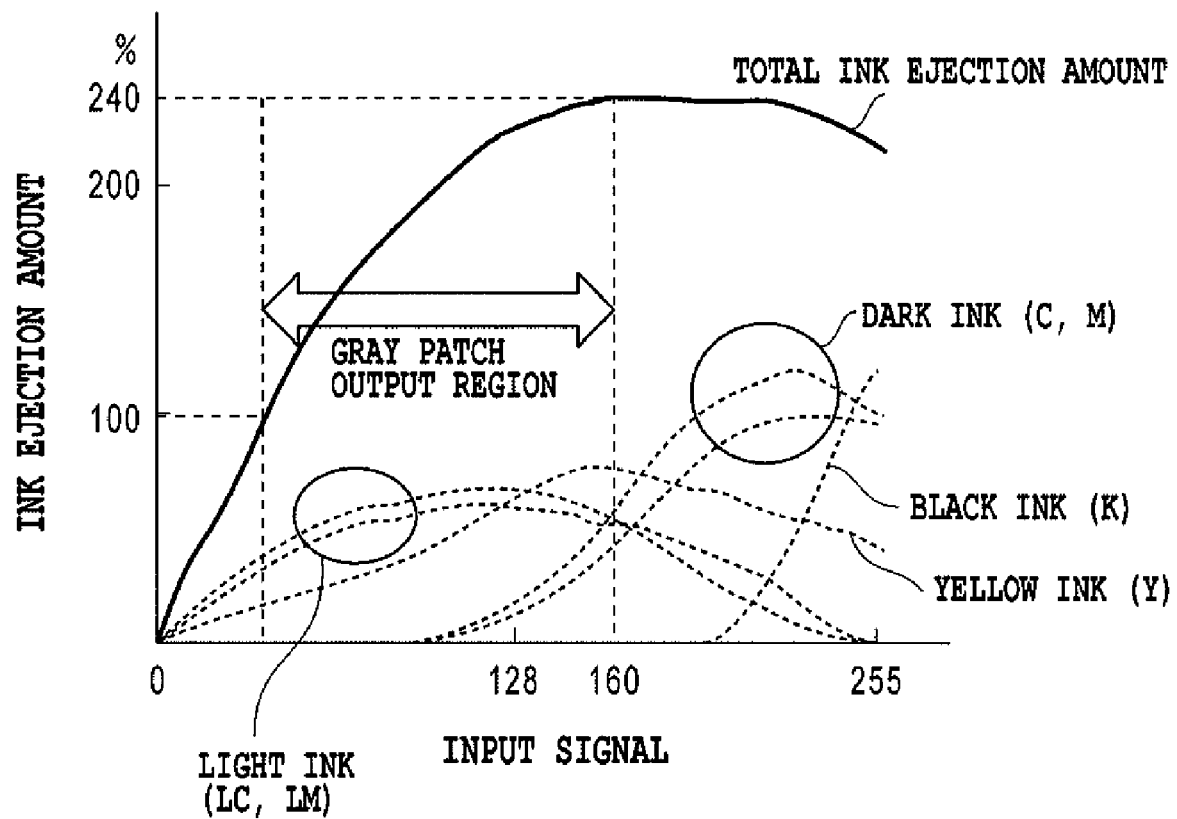
FIG. 6 is a graph showing an example of the ink ejection amount for realizing a gray line according to the first embodiment.

FIG. 3 is a diagram showing the check pattern for print mode selection. The pattern is made by arranging a plurality of patches, and each patch, as described in FIG. 6, is printed in gray color generated by a combination of the ink ejection amounts of C, LC, K, Y, LM and M used for the printer 107. Specifically, the value of % shown in FIG. 3 indicates the total (%) of the ink ejection amounts of the six colors for constituting gray color by the combination of the six colors of ink. For example, 240% in FIG. 3 indicates that the total of the ink ejection amounts of C, M, Y, K, LC and LM is 240%.

As shown in FIG. 3, in the arrangements of the patches, the ink ejection amounts are different from each other in a main-scanning direction, and the number of passes in printing are different from each other in a sub-scanning direction. Moreover, in FIG. 3, for simplification of the figure, some of the patches are omitted, which have the ink ejection amounts different from each other in the main-scanning direction.

Figure 5:
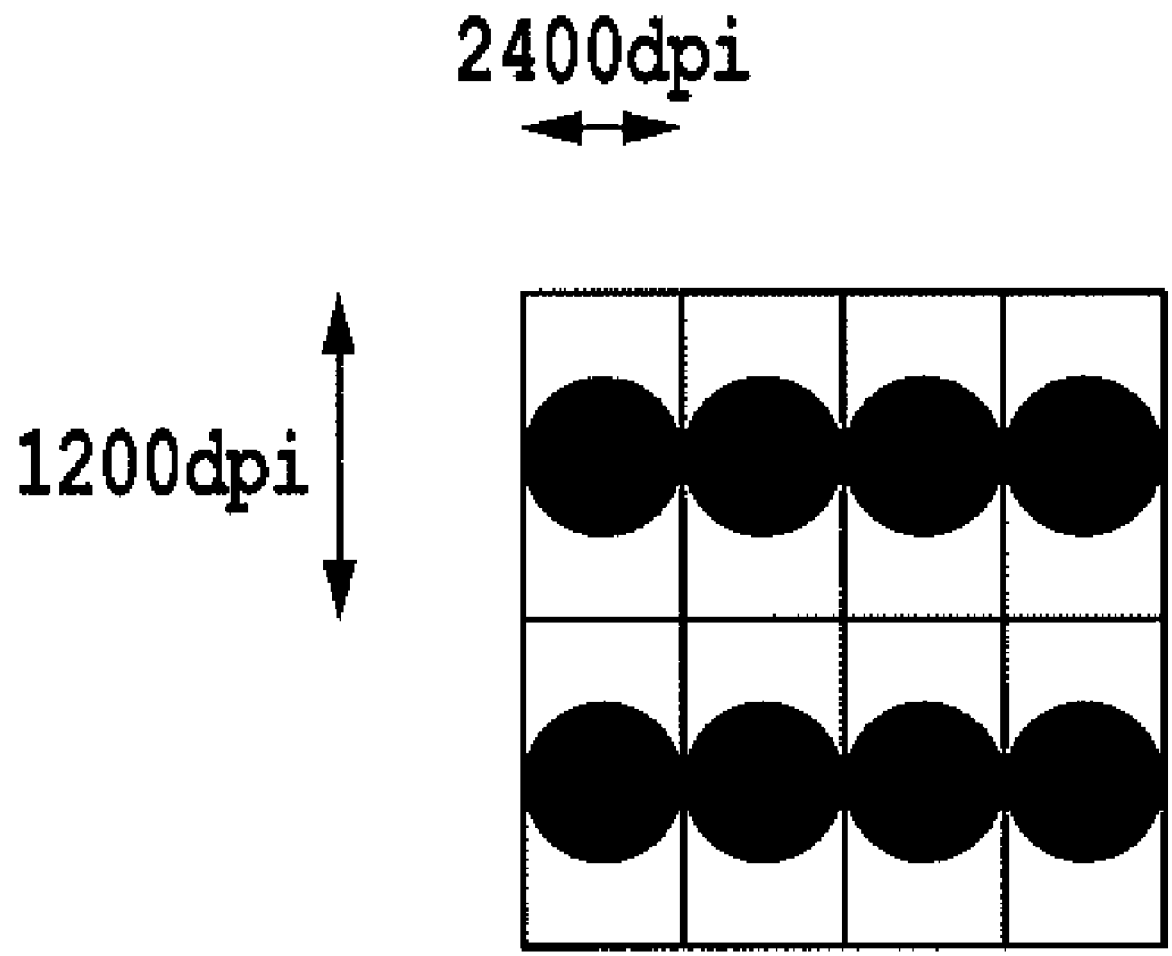
FIG. 5 is a diagram for describing the definition of the ink ejection amount.

The ejection amount increases by 20%, such as 100%, 120% . . . , from left in FIG. 3, and the maximum is 240% at the right end. The definition of the ejection amount (%) is as follows. As shown in FIG. 5, a state where ink droplet of 2 pl lands on all pixels of 4 pixels×2 pixels of resolution of 2400 dpi×1200 dpi, which are obtained by dividing a pixel of 600 dpi×600 dpi into four pixels in the main-scanning direction and into two pixels in the sub-scanning direction respectively, is defined as 100%. That is, for one pixel of 600 dpi×600 dpi, when the eight ink droplets of 2 pl land on that one pixel, the ejection amount is defined to be 100%.

FIG. 6 is a graph showing a relationship between a use rate of each color ink and a total of ink ejection amounts of the use rates of all the colors in the case where the ink jet printer of the present embodiment prints colors of a gray line from white to black. Specifically, FIG. 6 shows a part of the content of the color conversion section 105, and shows a combination of the ink colors representing each color in the gray line from white to black, which color is indicated by the input signals RGB.

In FIG. 6, the ink ejection amount of each of the six colors is indicated by a broken line, and the total ink ejection amount of the six colors is indicated by a solid line. Light inks LC and LM is mainly used in a highlight part, and the density is increased by beginning to use dark inks C and M from the middle gradation region, and further the black ink is used in a dark region, so that a gradation is maintained. Further, the yellow ink is generally used from the highlight region to the high-density region. Although the setting method of the gray line depends on concentrations of color materials in the inks used, the density rate of the dark ink and the light ink, and the diameter of the printed dot, the ejection amount becomes maximum in the region from the middle gradation region to dark region where the dark ink and the light ink are mixed, and tends to simply increase before the region of the maximum amount. An object of the present embodiment is to obtain the ink ejection amount that is permissible for the print medium that is used for printing. Accordingly, it is unnecessary to print the patches throughout the whole gradation. In the example shown in FIG. 6, the input signal value 160 corresponding to the maximum total ejection amount (240%) is set as maximum, and the gray patches are outputted by the combinations of the ink corresponding to the input signal values that each corresponds to the total ejection amount reduced 20% by 20%.

For the number of passes of the check pattern for print mode selection changing along the sub-scanning direction, the patches of the uppermost row are printed with 24-pass. After the patch print with 24-passe ends, the patches of the next row are printed with 12-pass. In this patch printing, a sufficient distance between the patches is taken so that the 24-pass printing and the 12-pass printing are not simultaneously executed. Thereafter, similarly, the number of passes is changed, from 8 to 6, and from 6 to 4, and the patches are printed for each row in this order.

Moreover, the reference symbols 301, 302 in FIG. 3 each denotes a register mark for detecting a patch position in scanner reading described below.

Figure 7:
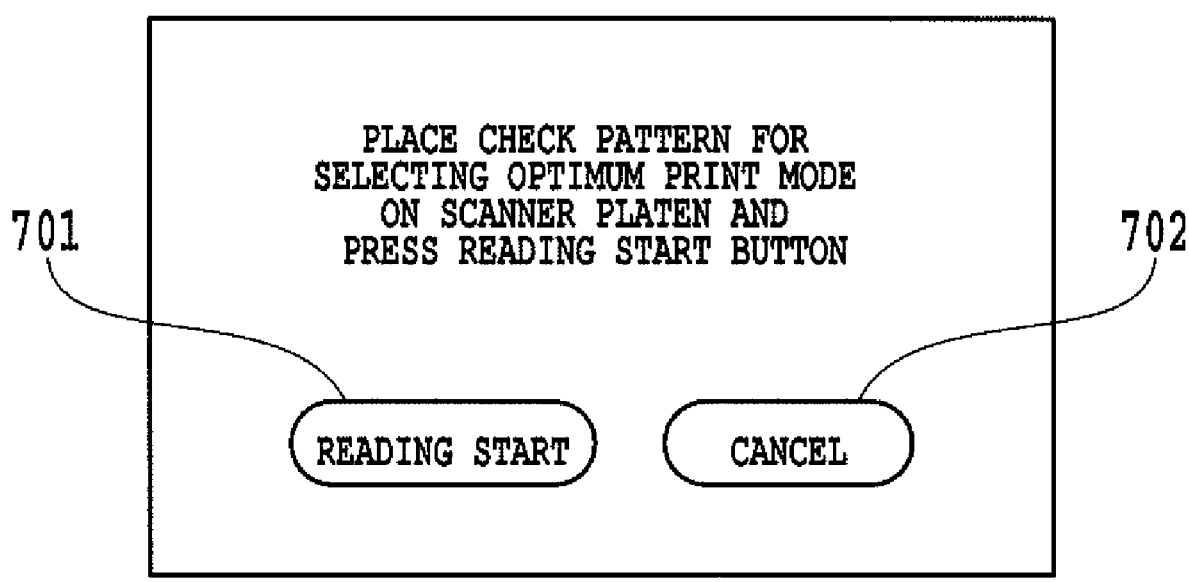
FIG. 7 is a view showing a UI for making the user select read start in reading the check pattern for print mode selection by a scanner in the first embodiment.

Referring to FIG. 2 again, in the next Step 203, each patch of the check pattern printed in Step 202 is read by the scanner 112. In this processing, a UI by the application 102 is displayed as shown in FIG. 7. When, in response to the display, the user sets the print sheet, on which the check pattern is printed, on a scanner platen and then presses a reading start button 702, reading the patch starts. In this case, preferably, a predetermined time may be taken from printing the check pattern to reading the patch by the scanner so that the ink dries. Additionally, time control may be executed by the application side so that the display shown in FIG. 7 does not appear, etc., until the predetermined time elapses.

Next, in Step 204, the granularity is calculated for each patch based on a scan image read by the scanner. As a method for calculating the granularity, various methods have been proposed. As an example of the method, the method by Makita and Ushiroda of Cannon Inc. can be cited, which is presented at the 22$^{nd}$ Seminar of The Institute of Image Electronics Engineers of Japan. In the method, the human visual feature VTF (Visual Transfer Function) presented by Dooley is considered based on the RMS granularity used for evaluation of photographic images, and the following evaluation function is used. That is, P' is calculated by multiplying an image sample P by a visual filter V, and the standard deviation of the pixel values of P' is set as the evaluation function G (Granularity). Moreover, in calculating VTF of the following expression (4), the observation distance is 286 mm.

$$G = \left\{ \frac{1}{N^2 - 1} \sum_{ij=1}^{N} (P'_{ij} - \overline{P})^2 \right\}^{1/2} \quad (1)$$

$$\overline{P} = \frac{1}{N^2} \sum_{ij=1}^{N} P'_{ij} \quad (2)$$

$$P'_{ij} = IFFT\{FFT(P_{ij}) \cdot V(f)\} \quad (3)$$

$$V(f) = \begin{cases} 5.05(e^{-0.138*5f})(1 - e^{-0.1*5f}) & : f \geq 1 \\ 1 & : f < 1 \end{cases} \quad (4)$$

$f$ : space frequency [cycles/mm]
$N^2$ : number of sampled pixels

Expression 1

Figure 14:
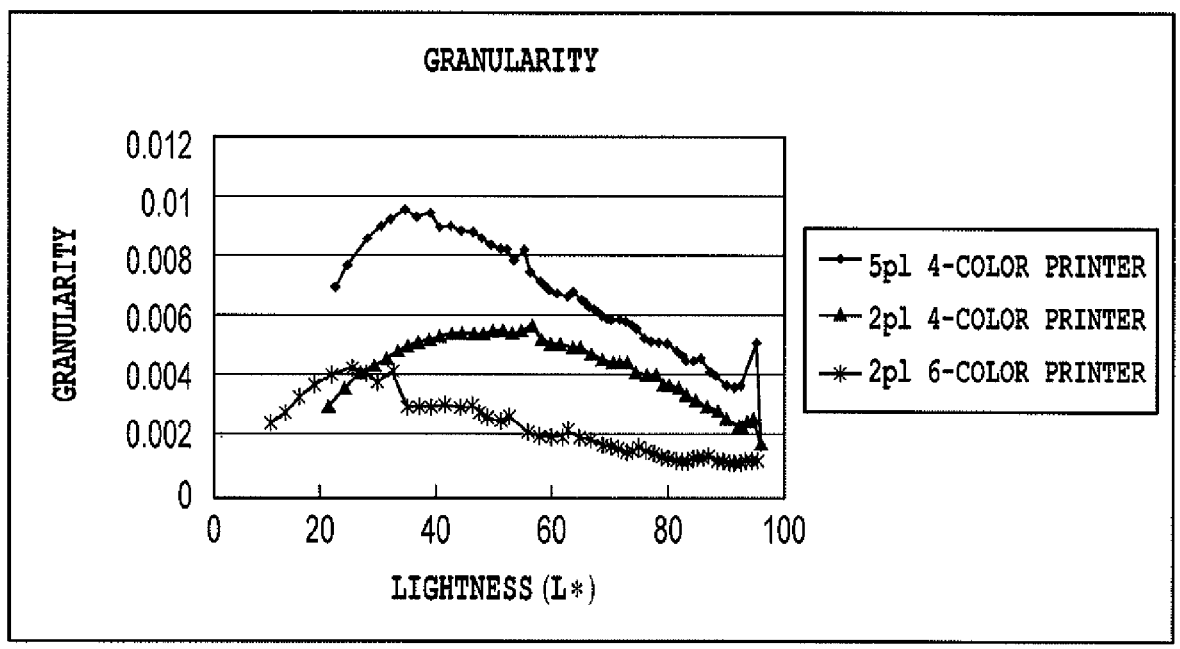
FIG. 14 is a graph showing the granularity numerically expressed by a granularity evaluation function for describing the first embodiment.

FIG. 14 shows an example of the granularity calculated with the granularity evaluation function.

Figure 8:
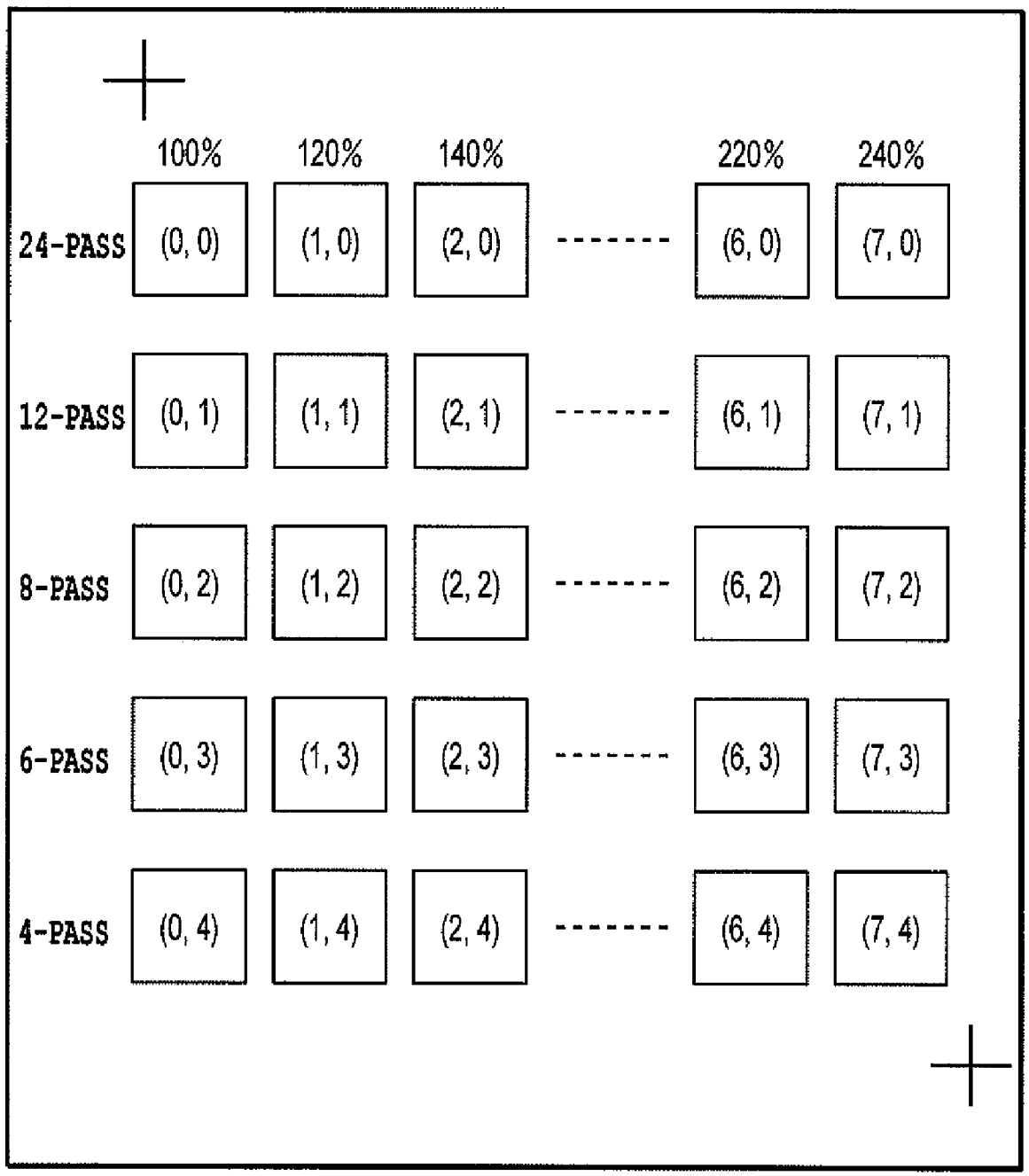
FIG. 8 is a diagram for describing coordinates of a patch in the check pattern for print mode selection of the first embodiment.

The granularity of each patch is calculated as the granularity evaluation function G obtained by the above expressions (1) to (4). The value G of granularity obtained by the calculation is indicated as G(x, y) when the position of each patch is indicated by two-dimensional coordinates (x, y) as shown in FIG. 8. For example, in the case of the ejection amount 140% and 8-pass, the position of the patch is indicated as (2, 2) and the granularity is indicated as G(2, 2). The application 102 calculates the granularity of the patch.

Using the granularity allows an evaluation for a beading phenomenon caused by overflow of the ink over the ink absorbable amount for a print medium to be numerically expressed, as described below. That is, in the case of no beading, since the granularity of a dot formed by landing of the ink droplet having a size of 2 pl is employed, the value of granularity is relatively low. On the other hand, in the case of the beading, since the ink droplets are connected to each other on the print medium and constitute a relatively large mass of several dots or several tens of dots, the value of granularity becomes high.

Referring to FIG. 2 again, in the next Step 205, it is determined whether the value G(x, y) of the granularity of the patch calculated in Step 204 is lower than a preset threshold value G_th of the granularity. When it is thus determined that the value G is lower than the threshold, that is, the granularity is low, a granularity flag Gflag(x, y) of the patch is set as "1" in Step 206. On the other hand, when it is determined that the value G(x, y) of the granularity is not lower than the threshold value G_th, that is, the granularity is high, in Step 205, the granularity flag Gflag(x, y) of the patch is set as "0." The application 102 also executes the determination processing of the granularity with use of the threshold value.

Further, in Step 208, when the position of the patch is similarly indicated as the coordinates (x, y), a banding value B(x, y) of the patch is calculated based on image data of the patch. As a method for calculating the banding value, various methods have been proposed. As an example of the method, a banding evaluating method can be cited that is proposed in "Quantification of density unevenness of thermal printing system" of FUJIFILM Research Report No. 42 (1997) by Junichi Yoneda. In the evaluating method, assuming that the density unevenness is caused in the sub-scanning direction, the image data is averaged in the main-scanning direction orthogonal to the sub-scanning direction, and one-dimensional image data is converted into space frequency components by Fourier transformation. After the data is further filtered by the space frequency VTF corresponding to human visual sensation, the RMS value of the power spectrum is made as the banding value.

Since the banding value becomes high in the case where a connection stripe or bidirectional color unevenness occurs when the small number of passes, it can be used as an index for obtaining the proper number of passes applicable to the print medium.

In Step 209, it is determined whether the banding value B(x, y) calculated in Step 208 is smaller than a preset threshold value B_th of the banding. When it is determined that the banding value is lower than the threshold value, that is, the banding value is low, a banding flag Bflag (x, y) of the patch is set as "1" in Step 210. On the other hand, when it is determined the banding value is not lower than the threshold value B_th, that is, the banding value is high, in Step 209, the banding flag Bflag(x, y) of the patch is set as "0."

In Step 220, it is determined whether the processing of steps 204 to 211 described above is executed for all the patches of the chart shown in FIG. 3, and returning to Step 204 is made and the succeeding processing is repeated in the case where there is a patch that the calculation is incomplete.

As described above, the values of granularity and banding are calculated for each patch. The calculated values are then compared with the threshold values respectively, and thus presence of image deterioration such as beading, connection stripe or bidirectional color unevenness can be detected, Which are related with the two parameters of the ink ejection amount and the number of passes. That is, in Steps 206 and 209 in FIG. 2, the patch, in which "1" is set to both the granularity flag Gflag (x, y) and banding flag Bflag (x, y), is one at a level that the granularity and banding can be negligible. In other words, it can be said that no image deterioration such as beading, connection stripe or bidirectional color unevenness occurs.

FIG. 13 is a graph showing an example of the values of the granularity flag Gflag (x, y) and the banding flag Bflag (x, y) calculated for each patch shown in FIG. 3. In FIG. 13, the values of the granularity flag and the banding flag are indicated by the two-dimensional arrangement [Gflag (x, y), Bflag (x, y)] for each combination of the ejection amount and the number of passes.

FIG. 13 shows that the value of Gflag(x, y), which is a first factor (left factor) of the arrangement, is more likely to become 0 as the ejection amount is larger, and is more likely to become 1 as the ejection amount is smaller. Also, when the ejection amounts are the same, the value of the flag is more likely to become 1 as the number of passes is larger, that is, the granularity is more likely to become lower. The value of the flag is more likely to become 0 as the number of passes is smaller, that is, the granularity more likely to become higher. The reason is why the amount of ink used for print at one scan is large when the number of passes is small, when the ejection amounts are the same, and thus the beading is likely to occur at one scan.

Also, the value of Bflag(x, y), which is a second factor (right factor) of the arrangement, is more likely to become 1 as the number of passes is larger, that is, the banding value more likely to become lower. The value is more likely to become 0 as the number of passes is smaller, that is, the banding value more likely to become higher. Further, the value of the banding flag is more likely to become 1 as the ink ejection amount is smaller, that is, the banding value more likely to become lower, and is more likely to become 0 as the ink ejection amount is larger, that is, the banding value more likely to become higher.

In addition, linear relationships are not always made between the values of granularity and banding, and the ink ejection amount and the number of passes. For example, as shown in FIG. 13, both the flags of the granularity and banding of the patch in which the ejection amount is 200% and the number of passes is 8, are "1," but the flag of the granularity of the patch in which the ejection amount is 180% and the same number of passes is 8 is "0." The reason is why the granularity includes a factor other than the beading, for example, a fluctuation factor generated by influence of the half-toning, or there is a noise or fluctuation depending on the position in reading the patch by the scanner. In order to remove these error component, as shown in FIG. 3, the patches that have a combination not shown in the print mode setting table in two dimensional patches of the ink ejection amount and the number of passes is printed. Thus, a combination can be selected where the granularity and banding can be negligible.

Referring to FIG. 2 again, the next processing is executed in Step 212. Combinations in which the two-dimensional arrangement [Gflag (x, y), Bflag (x, y)] of the granularity flag and the banding flag is [1, 1] are extracted, for the coordinate x corresponding to the ink ejection amount and the coordinate y corresponding to the number of passes in FIG. 13. More specifically, the combinations where the value of x becomes maximum are extracted from the combinations satisfying both conditions of the granularity and banding that are image evaluation information. In the example shown in FIG. 13, the combinations of (x, y)=(5, 0), (5, 1) and (5, 2), that is, the combinations of the ink ejection amount 200% and the number of passes being 24, 12 and 8, satisfy the conditions.

Next, regarding the three combinations (x, y), the combination of (x, y) is extracted in which [Gflag(x, y), Bflag(x, y)]=[1, 1] is wholly established at x≦5 (maximum A) and y becomes maximum (maximum B). In the example shown in FIG. 13, when y=2, [Gflag(x, y), Bflag(x, y)]=[1, 1] is not established at X=4. However, when y=0, 1, [Gflag(x, y), Bflag(x, y)]=[1, 1] is established at whole x. Accordingly, the combination of (x, y) satisfying the conditions is (A, B)=(5, 1). That is, the condition of the ink ejection amount 200% and 12-pass is appropriate for the print medium on which the patches are printed.

Next, in Step 213, a print mode having a setting nearest the setting of the ejection amount and number of passes (200%, 12-pass) obtained in Step 212 is selected from the print mode table.

A table is shown in FIG. 11 where the maximum ink ejection amount of each print mode is added to the print mode table shown in FIG. 10. As shown in FIG. 11, there are various combinations of the maximum ink ejection amounts for each print mode. In the present embodiment, the plurality of print modes correspond to the type of the print medium, and can be distinguished from each other by the maximum ink ejection amount and the number of passes that are mode parameters. FIG. 12 is a diagram where the combinations shown in FIG. 11 are plotted as coordinates of the maximum ink ejection amounts and the number of passes. In the present embodiment, as shown in FIG. 12, print modes are not always present for all the distinguishable combinations of the ink ejection amount and the number of passes, and only the print modes, which are gray-colored in FIG. 12, are present. The combinations indicated by the gray color in FIG. 12 are similarly gray-colored in FIG. 13. That is, the gray-colored parts are combinations corresponding to the print modes of the present embodiment.

Specifically, a print mode is selected in which the combination of the ejection amount and the number of passes are nearest the combination of the maximum obtained in Step 212, (200%, 12-pass) and both the Gflag and Bflag are "1," in the combinations indicated by the gray color in FIG. 13. In the example shown in FIG. 13, two combinations of (180%, 12-pass) and (200%, 24-pass) are selected. Accordingly, two print modes, the (Mat paper A, Standard) mode and (Mat paper A, High image quality) mode, corresponding to the above two combinations are selected from the table shown in FIG. 12.

Next, in Step 214 in FIG. 2, it is determined whether a plurality of print modes selected in Step 213 are present. When it is judged the plurality of print modes are present, the print mode having a smaller ejection amount is selected in Step 215. The reason is why influence of the image deterioration by the beading is larger than that of the banding, where the beading is caused due to a large ejection amount and the banding is caused due to a small number of passes. Accordingly, the (Mat paper A, Standard) mode having the smaller ejection amount is selected in the above example.

Next, in Step 216, the user selects whether to register setting information of the selected print mode. A message is displayed on the UI of the application as shown in FIG. 15, and the user checks whether to register the setting information. When it is determined not to register the setting information in Step 216, advancing to Step 219 is made to terminate the processing. On the other hand, when it is determined to register the setting information in Step 216, advancing to Step 217 is made and a print mode to be used is registered in the print mode table storing section 116 (see FIG. 1) in accordance with the type of new print sheet (here, print sheet U is used). In the present embodiment, the (Mat paper A, Standard) mode is registered regarding the paper U. Additionally, in Step 218, the type of new print sheet of the paper U is registered on the UI of the printer driver.

As described above, according to the first embodiment of the present invention, when the print medium held by the user is used, it can be automatically determined and set which print mode is most suitable for printing among the plurality of print modes of the ink jet printer.

Second Embodiment

A second embodiment of the present invention is different from the above-described first embodiment in that a user previously selects a category of the type of print medium and an optimum print mode is automatically selected in the selected category. The basic configuration for processing and basic processing of the second embodiment are similar to the configuration of the first embodiment shown in FIG. 1 and the processing shown in FIG. 2, and then the second embodiment will be described with reference to FIGS. 1 and 2.

Similar to the first embodiment, the user selects start of the processing for automatically selecting a print mode for the held print sheet via the UI display (see FIG. 4) by the application 102, and then the processing of the present embodiment starts. Then a UI is displayed as shown in FIG. 16, and the user selects a category to which the held print medium belongs. In the following description, it is assumed that the user holds the paper sheet of a category of a glossy paper and semi-glossy paper type, and selects the category of the glossy paper and semi-glossy paper type.

Next, the patches for print mode selection are printed in Step 202. In the printing, the print mode table shown in FIG. 11 is referred based on the category selected by the user through the UI shown in FIG. 16, combinations of the ink ejection amount and the number of passes which correspond to the category is selected, and gray patches of the combination is printed. The category of the glossy paper and semi-glossy paper are selected in the present embodiment, and thus the combinations are selected in which the maximum ink ejection amount is 180% and the minimum number of passes is 4 as shown in FIG. 11.

Figure 17:
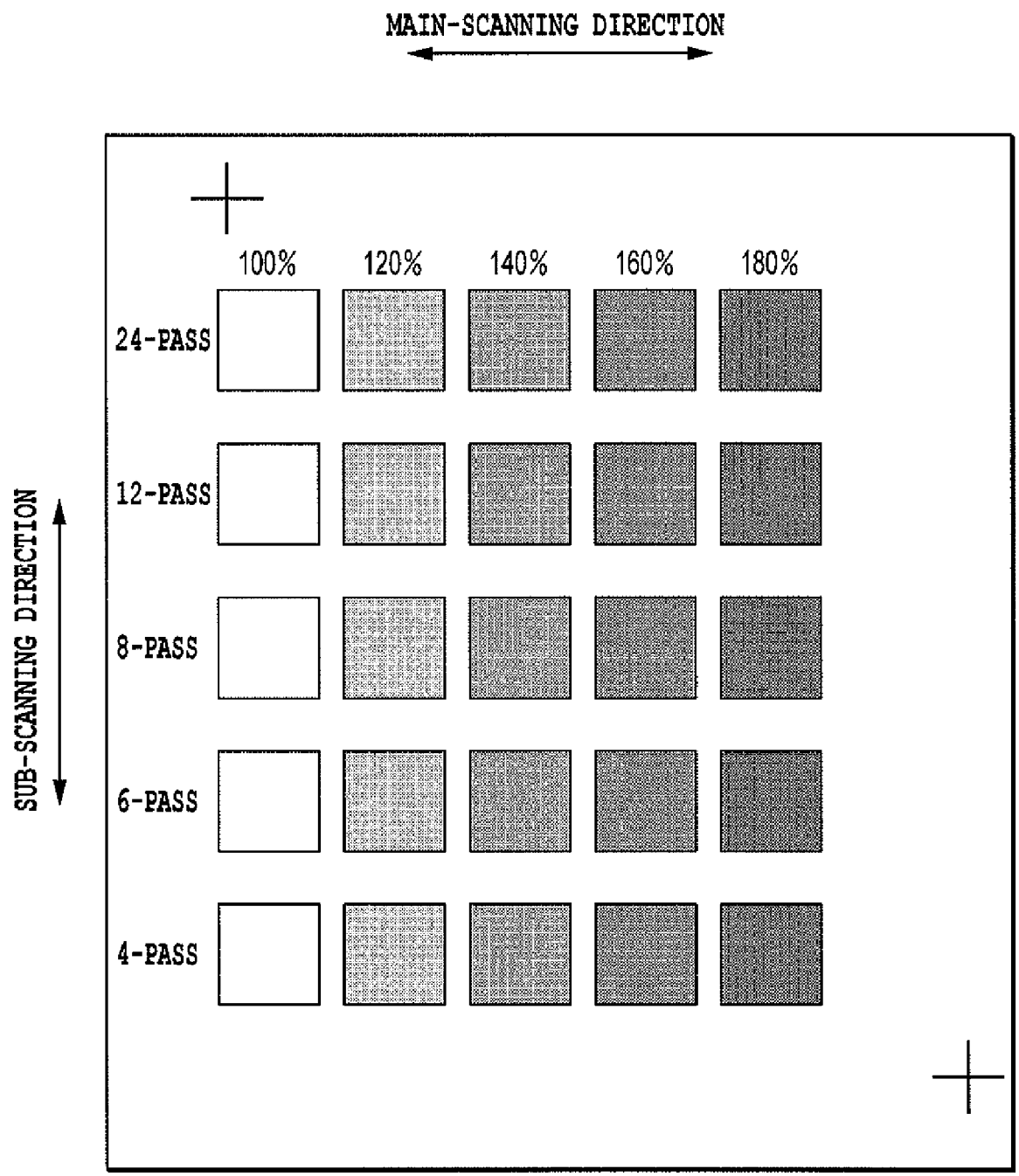
FIG. 17 is a diagram illustrating a patch arrangement of the check pattern for print mode selection for printing only a patch corresponding to the selected category in the second embodiment.

In this patch printing, more specifically, the print control section 109 of the ink jet printer 107 is informed of the category of print sheet selected via the UI of the application 102, through the print mode control section 115. The print control section 109 extracts the maximum ink ejection amount and the minimum number of passes present in the selected print sheet category from the information of the ink ejection amount and the number of passes for each print mode of the print mode setting table 113. Then, the extraction result is transmitted to the print mode selection check pattern generating section 114, so that data of the gray patches is generated as shown in FIG. 17. Additionally, the print control section 109 executes multi-pass print control of the plurality of passes based on the data.

As understand from FIG. 17, printing is only performed until the ejection amount of 180% which is the maximum ejection amount for the selected categories of the glossy paper or semi-glossy paper type. In other words, when the patches are printed at the ejection amount higher than 180%, there is a high possibility that the beading is caused by ink overflow, and an unnecessary patch is printed. Further, when a remarkably large amount of ink lands on the print medium in which the ejection amount is small without significant absorption, ink remains on the surface of the print medium, and then, undesirably, a possibility that a smear is caused by flow of the ink after printing.

The subsequent processing is similar to that of the first embodiment. Here, it is not necessary to calculate granularity and banding of patches which are not printed. Further, the granularity flag set in Steps 206, 207 and the banding flag set in Steps 210, 211 are set as 0 regarding those patches, so that the combinations of the above flags are not selected. In addition, although the minimum number of passes of the embodiment is the same as the number of 4 for the first embodiment, there is a possibility that the minimum number of passes changes depending on the selected category, and therefore the number of combinations of gray patches to be printed is reduced accordingly.

As described above, according to the present embodiment, a user previously selects a category of the print medium which the user holds, and thus patches not to be printed can be removed. Thus, trouble such as an ink drip, which is caused by remarkably excessive ink landing, is avoided, and the ink amount and time necessary for patch printing can be reduced.

Third Embodiment

In a third embodiment of the present invention, different from the first embodiment, gray charts are printed in all the print modes where it is determined that the granularity and banding can be negligible, then the printed gray chart are read by the scanner, and a print mode having the most excellent gray balance is selected.

Figure 18A:
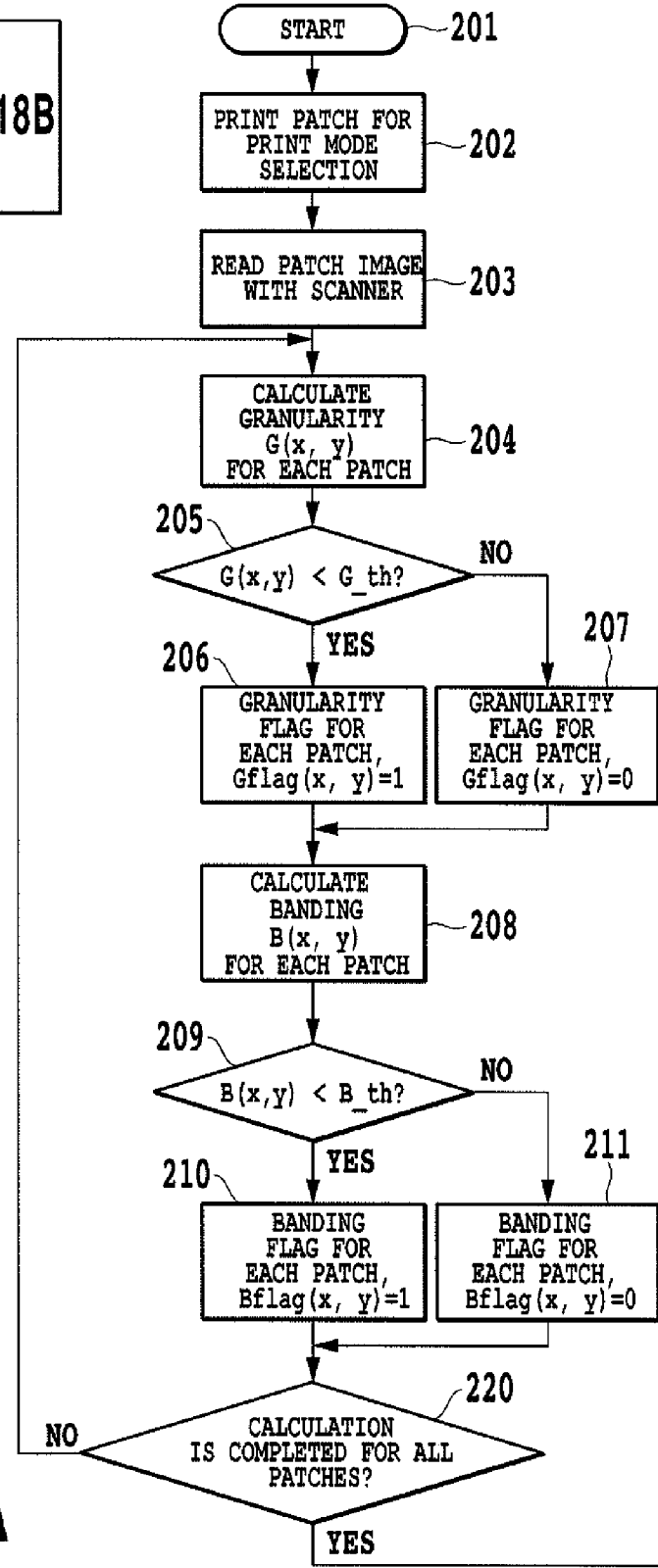
FIG. 18 is a diagram showing a relation between FIG. 18A and FIG. 18B, and FIGS. 18A and 18B are flowcharts showing print mode selection processing according to a third embodiment of the present invention.
Figure 18B:
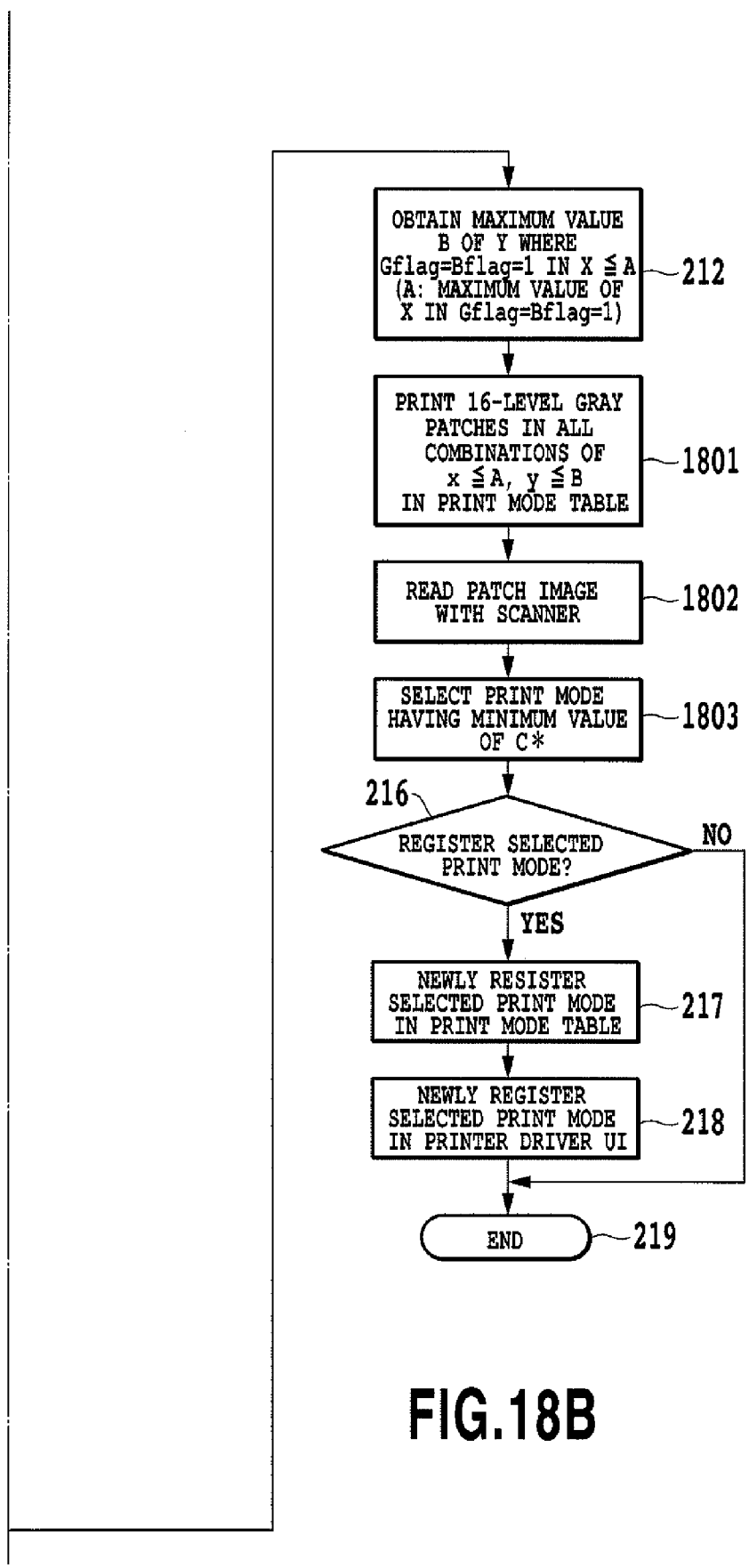

FIG. 18 is a flowchart showing print mode selection processing according to the present embodiment. In FIG. 18, the same reference numerals are attached to the same steps as that of the first embodiment shown in FIG. 2, and different reference numerals are attached to steps unique to the present embodiment.

In FIG. 18, similar to the first embodiment, the values of granularity and banding of the gray patch are calculated for automatic print mode selection in Steps 201 to 212, and the values of respective Gflag and Bflag are obtained for each patch as shown in FIG. 13. Further, an optimum ink ejection amount x and the optimum number of passes y are determined in Step 212. In an example shown in FIG. 13, the optimum ink ejection amount is x=5, i.e. 200%, and the optimum number of passes is y=2, i.e. 12-pass.

Next, in Step 1801, patches are printed in the print modes which correspond to the combinations of x ($\leqq$5) and y ($\leqq$5) shown in FIG. 13 and are listed in the print mode table. More specifically, the gray patches are printed in all the print modes corresponding to all combinations (x, y) of (x$\leqq$5) and (y$\leqq$5) among the combinations gray-colored in FIG. 13. In FIG. 12, six modes of (Mat Paper A, High image quality), (Mat Paper A, Standard), (Semi-glossy paper A, High image quality), (Glossy paper B, High image quality), (Semi-glossy paper B, High image quality) and (Semi-glossy paper B, Standard) correspond to those conditions. Here, gray patch image data of the six modes are generated by that the print mode control section 115 is informed of optimum print modes selected by the application 102. The print mode control section 115 transmits information indicating which print mode is selected to the color correction section 104, the color conversion section 105 and the half-toning section 106. Then a processing parameter corresponding to each print mode is set in the respective processing sections, and image processing for generating the gray chart is executed.

Figure 19:
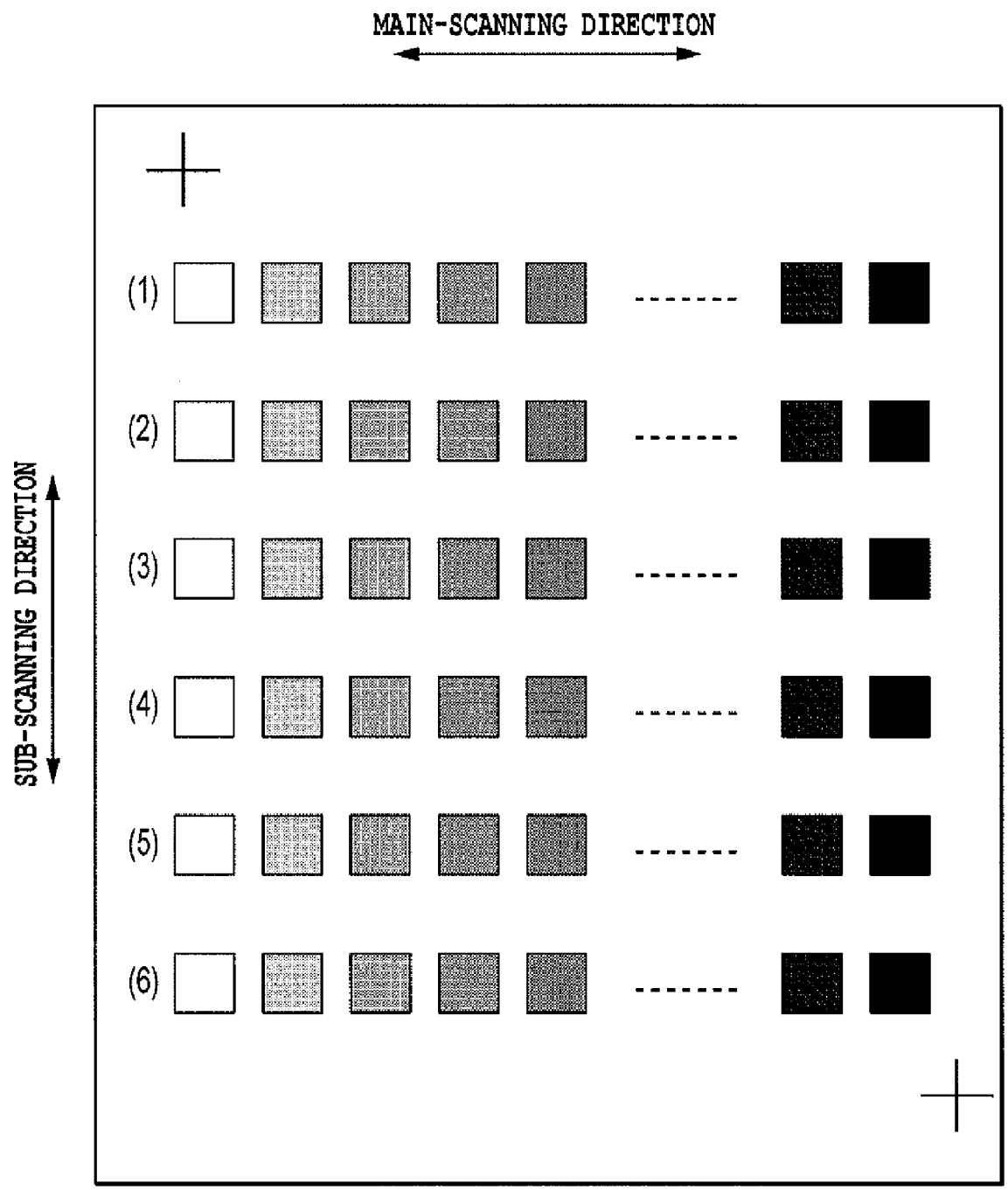
FIG. 19 is a diagram illustrating a patch arrangement of a gray gradation chart for gray balance measurement in the third embodiment.

FIG. 19 is a diagram illustrating layout of the gray patches printed in the present embodiment. In the present embodiment, the patches are printed in each of the corresponding six print modes, and thus six combinations of gray gradation patches are arranged in the sub-scanning direction. In FIG.

19, arrays (1) to (6) correspond to (Mat paper A, High image quality), (Mat paper A, Standard), (Semi-glossy paper A, High image quality), (Glossy paper B, High image quality), (Semi-glossy paper B, High image quality) and (Semi-glossy paper B, Standard), respectively. Naturally, each combination of patches is printed based on image data processed with the image processing parameter corresponding to the print mode, and is printed at the number of passes corresponding to the print mode. Further, the combination of gray gradation patches of each print mode is 16-levels patches, which are gradually changed in the main-scanning direction. In addition, in FIG. 19, a part of gradation patches in the main-scanning direction is omitted for simplification of illustration.

Referring to FIG. 18 again, in Step 1802, the gray patches shown in FIG. 19 are read with the scanner. In this reading, images of the 16-levels patches for each of the six print modes, i.e. 96 patches, are read as RGB data.

Next, in Step 1803, a print mode is selected in which the gray balance most matches with the paper. Specifically, patch image data of RGB read by the scanner is averaged for the plurality of patches corresponding to each print mode (patches of each of the six rows (1) to (6)) so that average RGB data is obtained respectively. Then the six averaged RGB data is each converted into data of average L*C*H*. Here, L* indicates lightness, C* indicates chroma, and H* indicates hue.

It is preferable that gray is an achromatic color where the chroma is zero, and, gray that contrarily has the chroma is not preferable as gray with a tint. Therefore, a print mode in which the average chroma C* of 16-levels is lowest is selected from data of the six sets of gray 16-levels patches determined as described above. That is, printing by the selected print mode is most preferable in terms of tint, and with the selected print mode, the gray balance is most suitable for the paper used.

As described above, according to the present embodiment, the gray gradation patches are printed, in the combinations of print modes each having an appropriate ejection amount and the proper number of passes, onto the paper used by a user, and the print mode can be selected in which the gray balance is most suitable for the paper. Thus, a print mode having higher precision can be automatically selected.

Fourth Embodiment

In a fourth embodiment of the present invention, different from the first embodiment, a plurality of candidates of print mode are presented to a user so that the user can select a desirable print mode. The basic configuration for processing and the basic processing of the fourth embodiment are similar to those of the first embodiment. Print mode selection processing of the present embodiment will be described with reference to FIG. 25 in which reference numerals different from those in FIG. 2 are attached to different parts only.

Figures 25, 25A:
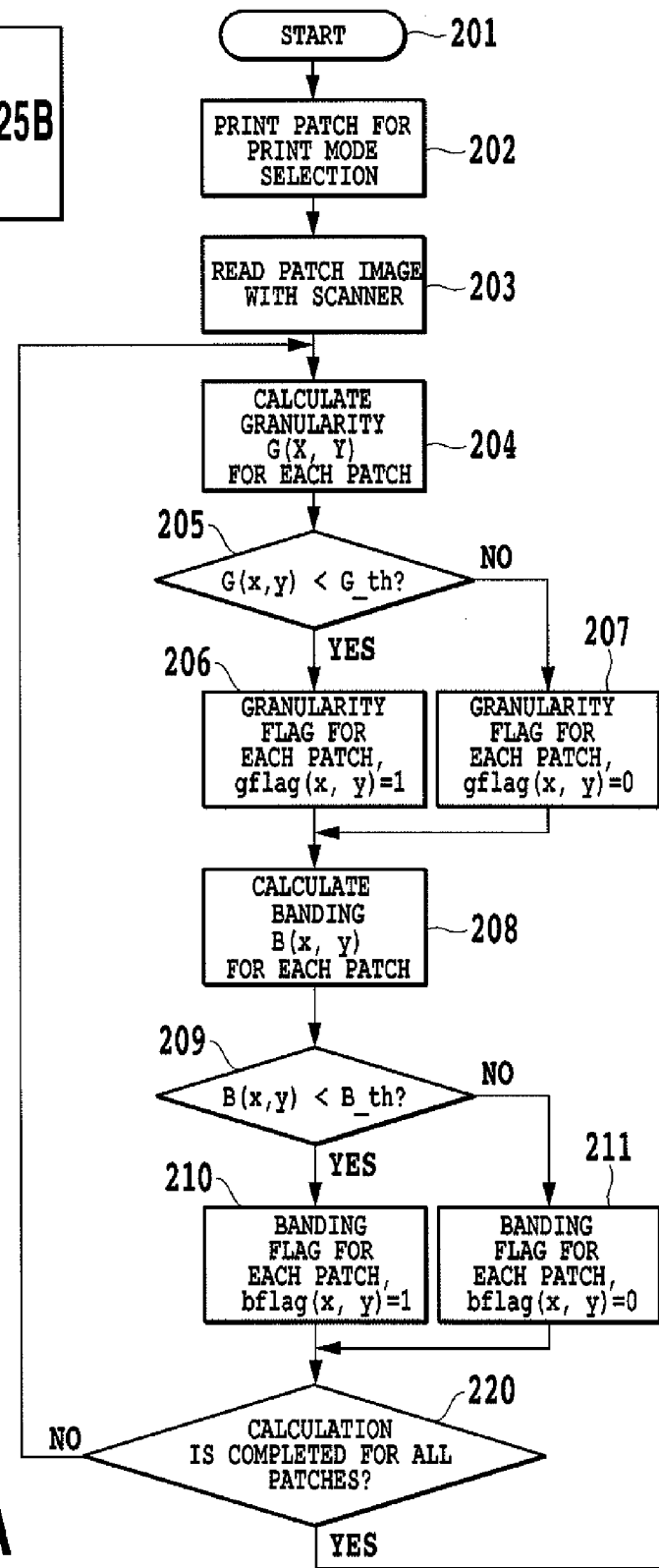
FIG. 25 is a diagram showing a relation between FIG. 25A and FIG. 25B, and FIGS. 25A and 254B are flowcharts showing print mode selection processing according to a fourth embodiment of the present invention.
Figure 25B:
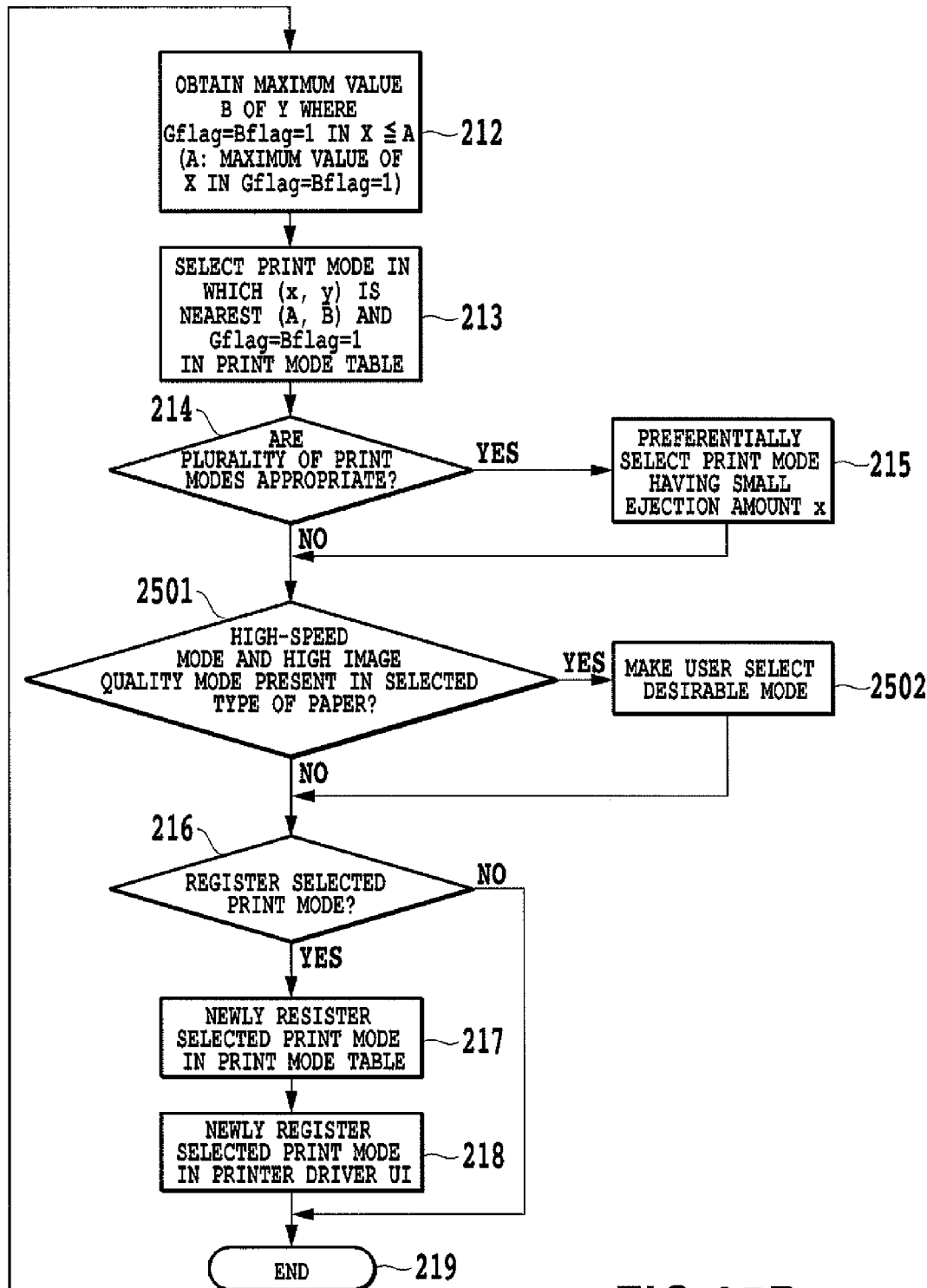

In FIG. 25, an optimum print mode is selected from the print modes in which it is judged, based on the values of granularity and banding, that printing can be performed on the print sheet that a user uses for printing in the processing of step 202 to step 215. In the example shown in FIG. 13, the (Mat paper A, High image quality) mode is selected which corresponds to the ejection amount of 200% and 24-pass.

Next, in Step 2501, it is determined whether a plurality of high-speed modes and high image quality modes are present for the type of print sheet of the automatically selected print mode. In the present embodiment, 12-pass, Standard mode, and 24-pass, High image quality mode are present for the Mat paper A, and therefore the determination result in Step 2501 is "Yes."

Then, step 2502 causes the user to select a desirable print mode. At that time, a UI is displayed by the application 102 as shown in FIG. 26, so that the user selects either speed priority mode or image quality priority mode. When the user selects the speed priority mode, printing is performed in the (Mat paper A, Standard) mode, or when the user selects the image quality priority mode, printing is performed in the (Mat paper A, High image quality) mode.

As described above, according to the present embodiment, the type of print sheet can be selected that is most suitable for the print sheet which the user holds, and the user can select any of the speed priority mode and high image quality mode for the type of print sheet. Consequently, the print mode can be set by further responding to the user's request.

Other Embodiment

Figure 24A:
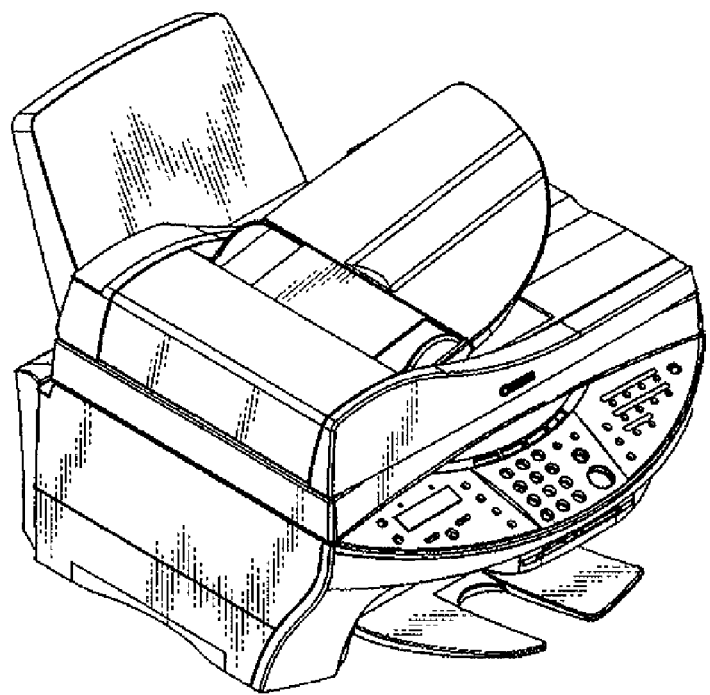
FIG. 24A and FIG. 24B are perspective views showing a multi-function printer (MFP) according to the embodiments of the present invention.
Figure 24B:
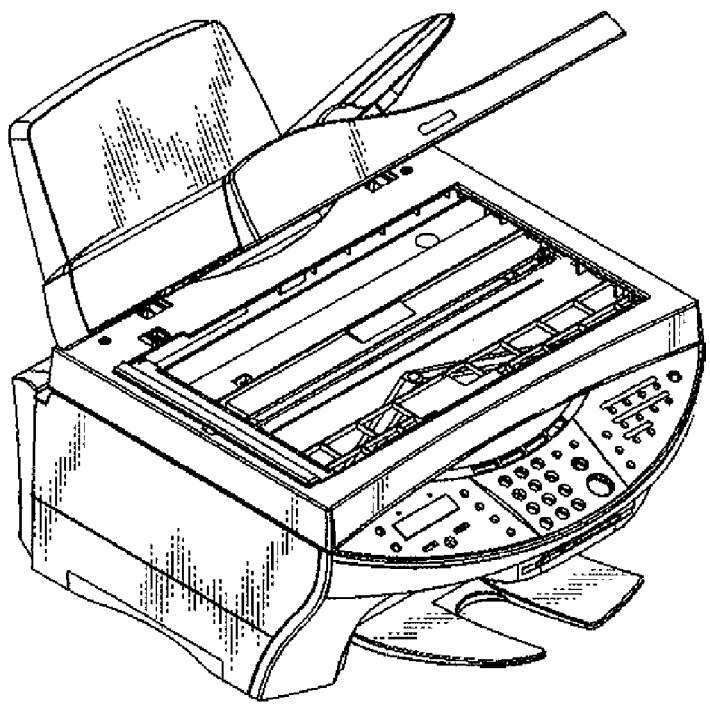

Regarding the above first to third embodiments, the system using the scanner is described above. However, a system of the present invention is not limited thereto. As shown in FIGS. 24A and 24B, a scanner can be used which is mounted on a multi-function printer (hereinafter, referred to as MFP) having an ink jet printer and the scanner combined. In this case, even if there is no PC used in the above embodiments, a series of processing shown in FIG. 2, etc., can be executed by operation on a panel for controlling the MFP and use of a controller in the MFP. This MFP is included in the ink jet printer of the present invention.

Figure 20:
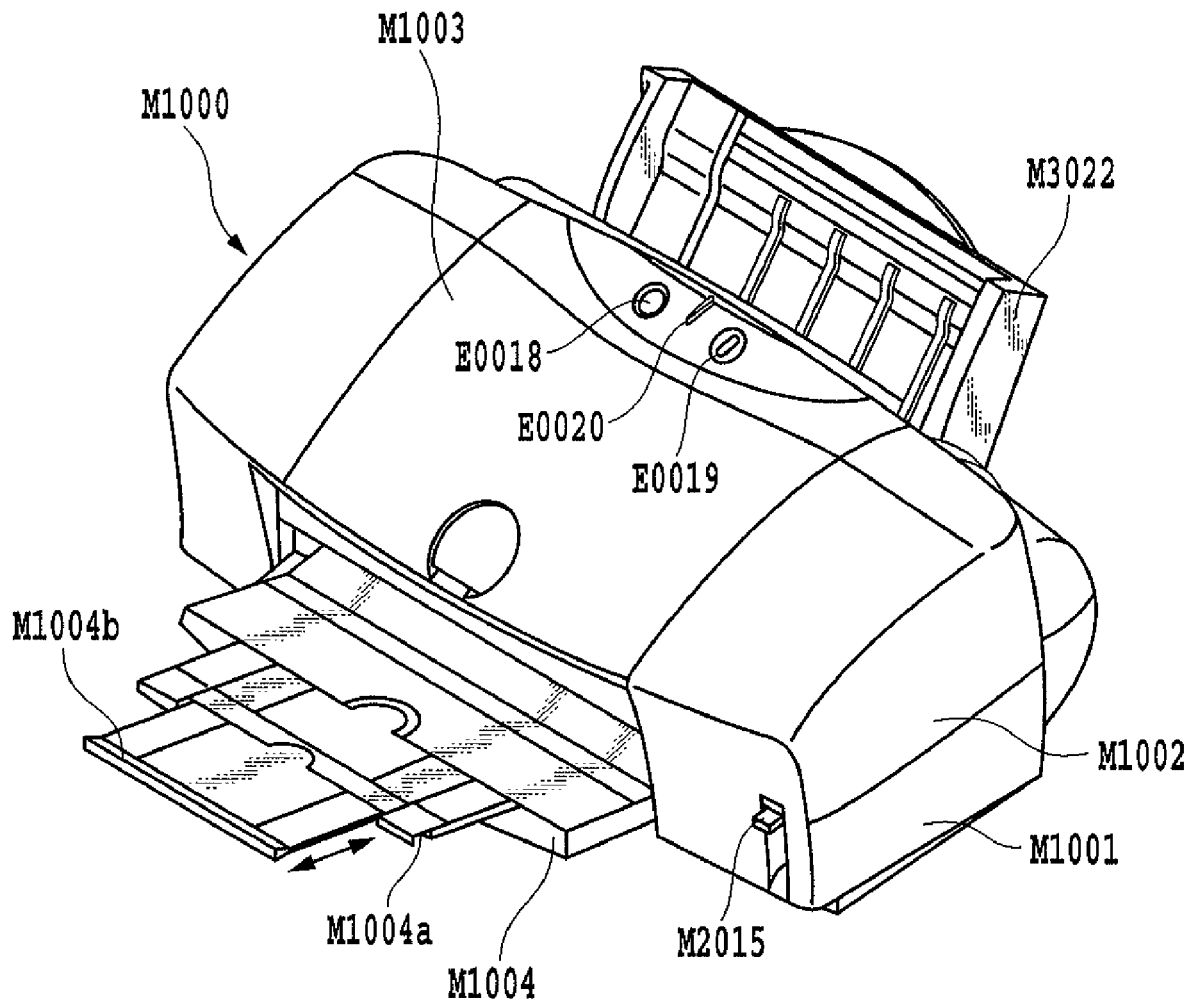
FIG. 20 is an external appearance view showing an ink jet printer according to the embodiments of the present invention.
Figure 21:
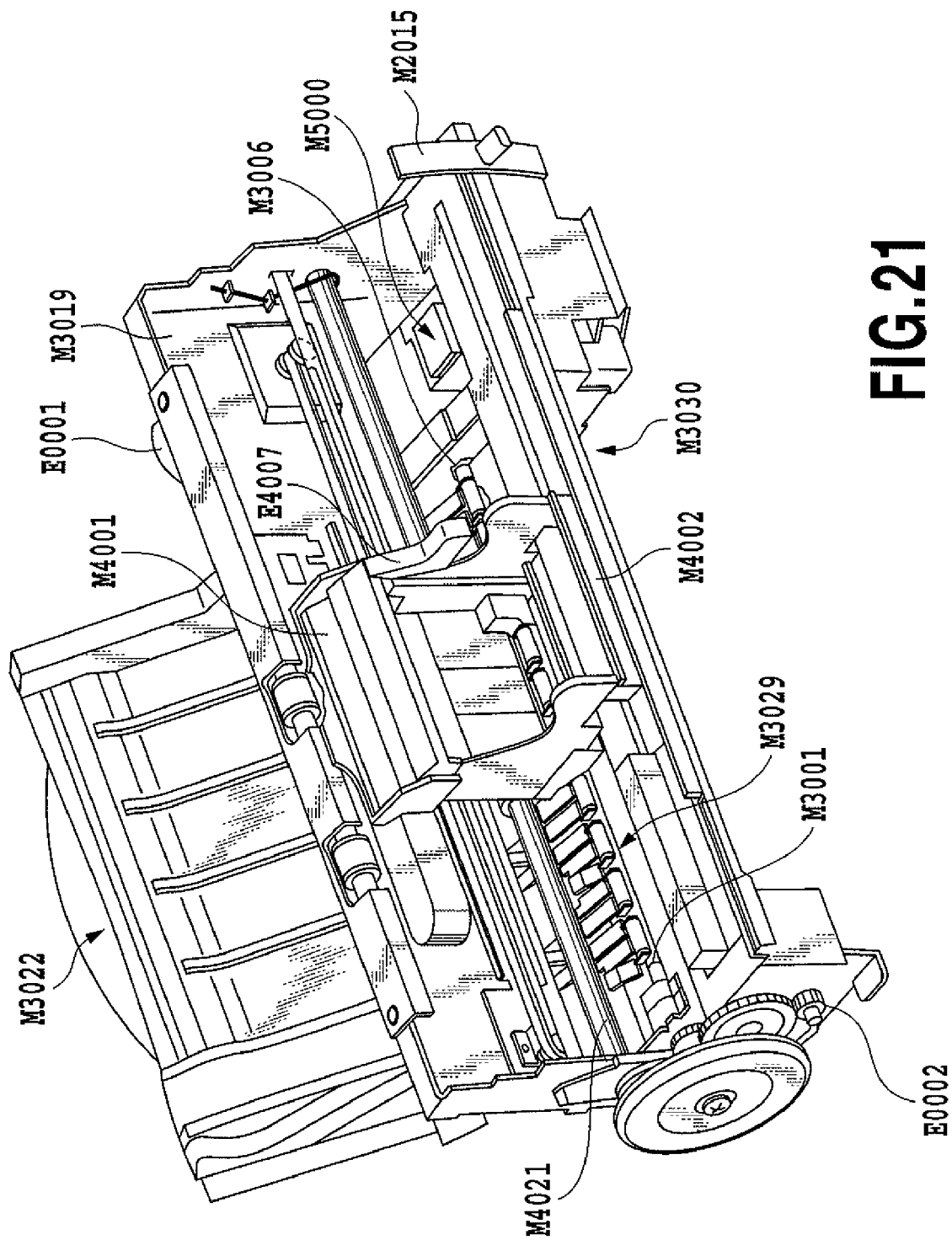
FIG. 21 is a view showing the ink jet printer from which an exterior part is detached.
Figure 22:
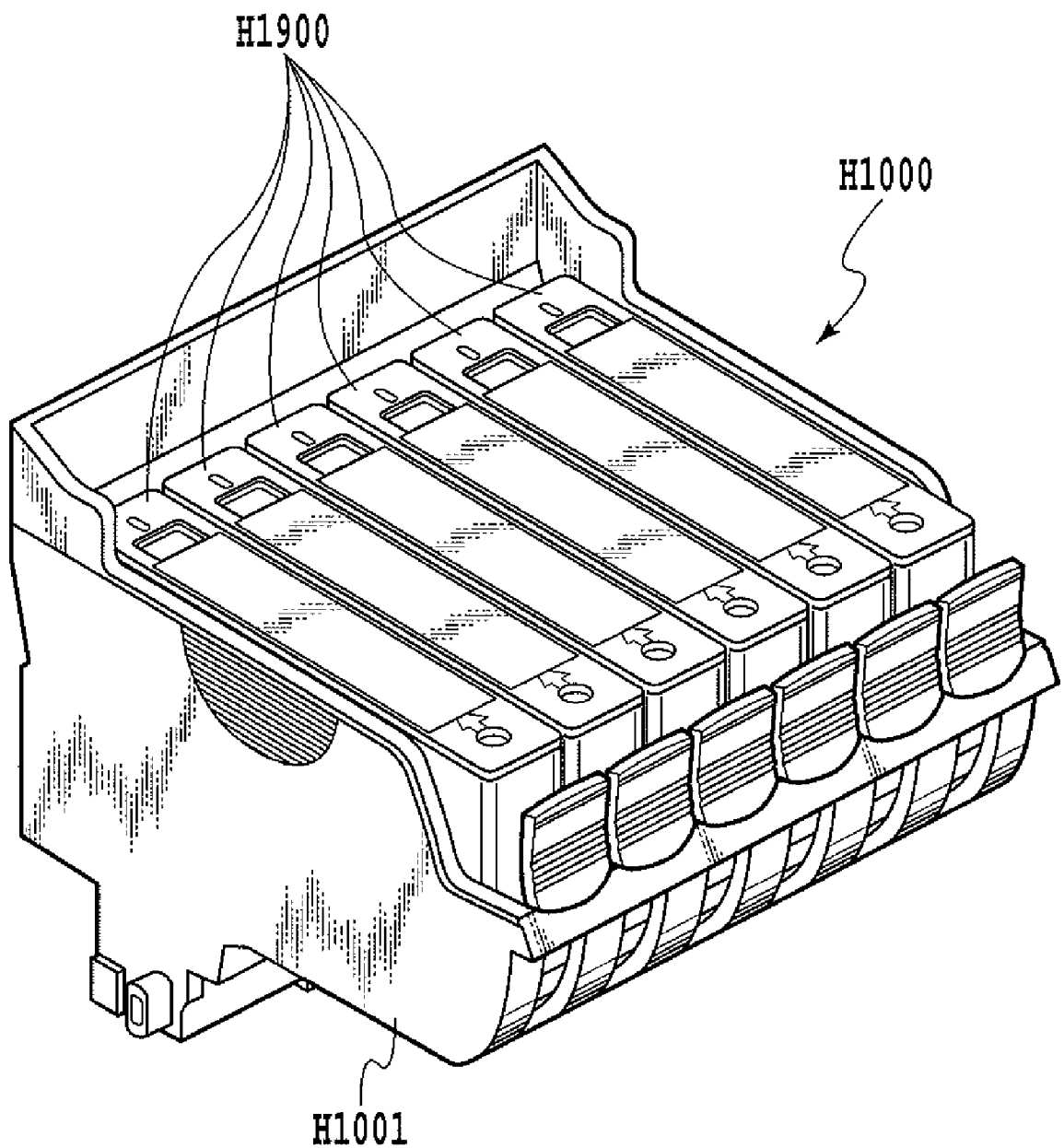
FIG. 22 is a perspective view showing a print head used in the ink jet printer.

Similarly, the present invention is applicable to an ink jet printer which can be used as a scanner by exchanging a print head cartridge with a scanner cartridge, the ink jet printer being shown in FIG. 20 to FIG. 23. FIG. 20 is an external appearance view of the ink jet printer, FIG. 21 is a view showing the ink jet printer from which an exterior part is detached, FIG. 22 is an external appearance view of the print head, and FIG. 23 is an external appearance view of the scanner cartridge. The print head and the scanner cartridge are mounted on a carriage M4001 in FIG. 21, and the user can exchange them with each other in accordance with use. Accordingly, as long as the processing steps of the present invention are taken even if the print cartridge is exchanged with the scanner cartridge, the selecting method of the present invention can be performed.

Additionally, the patch may be read by not only the scanner but an exclusive sensor mounted on the ink jet printer. In this case, since time from patch printing to reading by the sensor can be managed, colorimetry can be performed at higher precision.

Additionally, instead of automatically reading the patch by the scanner or sensor, the user may visually determine the presence of the beading or banding of the patch and select an optimum patch, thereby selecting an optimum print mode.

Further, the present invention is applicable to not only the case where non-genuine print sheet is used but also the case where non-genuine ink is used by the user. That is, even in a situation where image degradation generally occurs and print sheet and ink are wasted in using the non-genuine ink having a property different from that of genuine ink, a print mode can be automatically selected by using the system of the present invention, the print mode allowing the user to be approximately satisfied in terms of image quality. Consequently, the level of satisfaction of the user is improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-339953, filed Dec. 18, 2006, which is hereby incorporated by reference herein in its entirety.

What is claimed is:

1. An ink jet printing apparatus that uses a print head to perform printing and is capable of executing a plurality of print modes which are distinguished from each other by mode parameters and are set correspondingly to types of print medium, said apparatus comprising:
   a patch printing unit that prints a plurality of patches in which values of the mode parameters are differentiated, when a print medium other than print media corresponding to the respective plurality of print modes is used;
   an evaluation obtaining unit that obtains image evaluation information for each of the mode parameters that are differentiated from each other, based on measurement results of the printed patches; and
   a selecting unit that selects a print mode from the plurality of print modes set correspondingly to the types of print medium, based on the mode parameters for which evaluations, indicated by the image evaluation information, are above a certain evaluation level,
   wherein said patch printing unit includes a category obtaining unit that obtains category information indicating which category of a plurality of categories the print medium other than print media corresponding to the respective plurality of print modes, belongs to, where each category of the plurality of categories groups a respective plurality of types of print media, and
   wherein said patch printing unit prints the plurality of patches such that values of the mode parameters are differentiated within a range corresponding to the category of the plurality of categories that is obtained by said category obtaining unit.

2. An ink jet printing apparatus as claimed in claim 1, wherein the mode parameters are a maximum ejection amount of ink to the print medium and a number of scans by which printing for a given region is completed, where scanning of the print head is performed to the given region a plurality of times.

3. An ink jet printing apparatus as claimed in claim 1, wherein the image evaluation information is a granularity value and a banding value.

4. An ink jet printing apparatus as claimed in claim 1, wherein said selecting unit obtains the mode parameter, the value of which is a maximum among the mode parameters for which evaluations, indicated by the image evaluation information, are above a certain evaluation level, and selects the print mode which is closest to the obtained mode parameter.

5. An ink jet printing apparatus as claimed in claim 4, wherein said selecting unit obtains the mode parameter the value of which is a maximum among the mode parameters for which evaluations, indicated by the image evaluation information, are above a certain evaluation level, and selects the print mode having a minimum value of mode parameter when there are a plurality of print modes which are closest to the obtained mode parameter.

6. An ink jet printing apparatus as claimed in claim 1, wherein said selecting unit includes a second patch printing unit that prints gray patches for each of the print modes corresponding to mode parameters for which evaluations, indicated by the image evaluation information, are above a certain evaluation level, and selects the print mode corresponding to the gray patch having lowest chroma among gray patches of the respective print modes.

7. An ink jet printing apparatus as claimed in claim 1, wherein the measurement of the patches is executed by a scanner that reads the patches.

8. A print mode selecting method for an ink jet printing apparatus that uses a print head to perform printing and is capable of executing a plurality of print modes which are distinguished from each other by mode parameters and are set correspondingly to types of print medium, said method comprising:
   a patch printing step of printing a plurality of patches in which values of the mode parameters are differentiated, when a print medium other than print media corresponding to the respective plurality of print modes is used;
   an evaluation obtaining step of obtaining image evaluation information for each of the mode parameters that are differentiated from each other, based on measurement results of the printed patches;
   a selecting step of selecting a print mode from the plurality of print modes set correspondingly to the types of print medium, based on the mode parameters for which evaluations, indicated by the image evaluation information, are above a certain evaluation level; and a category obtaining step of obtaining category information indicating which category of a plurality of categories the print medium other than print media corresponding to the plurality of print modes, belongs to, where each of the plurality of categories groups a respective plurality of types of print media,
   wherein the plurality of patches are printed such that values of the mode parameters are differentiated within a range corresponding to the category of the plurality of categories that is obtained in the category obtaining step.

9. A print mode selecting method as claimed in claim 8, wherein the mode parameters are a maximum ejection amount of ink to the print medium and a number of scans by which printing for a given region is completed, where scanning of the print head is performed to the given region a plurality of times.

10. A print mode selecting method as claimed in claim 8, wherein the image evaluation information is a granularity value and a banding value.

11. A print mode selecting method as claimed in claim 8, wherein said selecting step obtains the mode parameter, the value of which is a maximum among the mode parameters for which evaluations, indicated by the image evaluation information, are above a certain evaluation level, and selects the print mode which is closest to the obtained mode parameter.

12. A non-transitory computer readable medium that stores a program that is read by a computer so as to cause the computer to execute a print mode selecting process for an ink jet printing apparatus that uses a print head to perform printing and is capable of executing a plurality of print modes which are distinguished from each other by mode parameters and are set correspondingly to types of print medium, said processing comprising:
   a patch printing step of printing a plurality of patches in which values of the mode parameters are differentiated, when a print medium other than print media corresponding to the respective plurality of print modes is used;
   an evaluation obtaining step of obtaining image evaluation information for each of the mode parameters that are differentiated from each other, based on measurement results of the printed patches;
   a selecting step of selecting a print mode from the plurality of print modes set correspondingly to the types of print medium, based on the mode parameters for which evaluations, indicated by the image evaluation information, are above a certain evaluation level; and a category obtaining step of obtaining category information indicating which category of a plurality of categories the print medium other than print media corresponding to the plurality of print modes, belongs to, where each of the plurality of categories groups a respective plurality of types of print media, wherein the plurality of patches are printed such that values of the mode parameters are differentiated within a range corresponding to the category of the plurality of categories that is obtained in the category obtaining step.

* * * * *